United States Patent
Hogan et al.

(10) Patent No.: US 10,333,910 B2
(45) Date of Patent: *Jun. 25, 2019

(54) DATABASE-CENTERED COMPUTER NETWORK SYSTEMS AND COMPUTER-IMPLEMENTED METHODS FOR CRYPTOGRAPHICALLY-SECURED DISTRIBUTED DATA MANAGEMENT BASED ON ENTROPY AND HAVING A SUPERVISORY NODE

(71) Applicant: Broadridge Financial Solutions, Inc., Lake Success, NY (US)

(72) Inventors: John Hogan, Lake Success, NY (US); Lyell Dampeer, Hyde Park, NY (US); Laxmikanth Venkatraman, Hyderabad (IN); Vijay Mayadas, New York, NY (US); Patricia Rosch, Caledon (CA); John Gullotta, Edgewood, NY (US); Ashfaq Shaik, Hyderabad (IN); Saheer Shaik, Hyderabad (IN); Horacio Barakat, New York, NY (US); Kishore Seshagiri, Hyderabad (IN); James Wiegand, Edgewood, NY (US); Elizabeth Maiellano, Norwell, MA (US); Rekha Sampath, Toronto (CA)

(73) Assignee: Broadridge Financial Solutions, Inc., Lake Success, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/957,610

(22) Filed: Apr. 19, 2018

(65) Prior Publication Data
US 2019/0141018 A1 May 9, 2019

Related U.S. Application Data

(63) Continuation of application No. 15/808,714, filed on Nov. 9, 2017, now Pat. No. 9,967,238.

(51) Int. Cl.
| | | |
|---|---|---|
| H04L 29/06 | (2006.01) | |
| H04L 9/32 | (2006.01) | |
| G06F 16/27 | (2019.01) | |

(52) U.S. Cl.
CPC .......... *H04L 63/0435* (2013.01); *G06F 16/27* (2019.01); *H04L 9/3242* (2013.01); *H04L 63/061* (2013.01); *H04L 63/10* (2013.01)

(58) Field of Classification Search
None
See application file for complete search history.

(56) References Cited

U.S. PATENT DOCUMENTS

| | | |
|---|---|---|
| 8,639,625 B1 | 1/2014 | Ginter et al. |
| 2012/0155643 A1* | 6/2012 | Hassan .................. H04L 9/083 380/270 |

(Continued)

FOREIGN PATENT DOCUMENTS

| | | |
|---|---|---|
| WO | 2017/145007 A1 | 8/2017 |

OTHER PUBLICATIONS

European Search Report from European Patent Application No. 18169360.7 dated Dec. 13, 2018.

(Continued)

*Primary Examiner* — Shin-Hon (Eric) Chen
(74) *Attorney, Agent, or Firm* — Greenberg Traurig, LLP

(57) ABSTRACT

In some embodiments, the present invention provides for an exemplary computer system which includes at least the following components: a network of externally owned presence (EOP) member nodes, including a supervisory EOP member node is configured to generate at least one personalized cryptographic private key for each peer EOP member node; a distributed database, storing a plurality of persistent data objects; and a plurality of self-contained self-executing software containers (SESCs); where each SESC includes an (Continued)

independently executable software code which is at least configured to: apply entropy to generate a state hash representative of a current state of a persistent data object, perform a data action with the persistent data object; and determine that a particular EOP member node has a permission to cause the SESC to perform the data action with the persistent data object based.

16 Claims, 22 Drawing Sheets

(56) References Cited

U.S. PATENT DOCUMENTS

| | | | | |
|---|---|---|---|---|
| 2012/0221649 | A1* | 8/2012 | Bhogal | H04L 51/08 709/206 |
| 2013/0007442 | A1* | 1/2013 | Mao | H04L 63/0823 713/156 |
| 2016/0197731 | A1* | 7/2016 | Hyun | H04L 9/3247 713/176 |
| 2016/0357550 | A1 | 12/2016 | Thomas et al. | |
| 2017/0109735 | A1 | 4/2017 | Sheng et al. | |
| 2017/0180346 | A1 | 6/2017 | Suarez et al. | |
| 2017/0232300 | A1 | 8/2017 | Tran et al. | |
| 2017/0287090 | A1 | 10/2017 | Hunn et al. | |
| 2017/0324711 | A1* | 11/2017 | Feeney | H04L 63/0428 |
| 2018/0091316 | A1 | 3/2018 | Stradling et al. | |
| 2018/0260909 | A1 | 9/2018 | Li | |

OTHER PUBLICATIONS

Liang et al., "Waite Paper" ethereum/wiki Wiki GitHub; retrieved May 29, 2017 <<https://github.com/ethereum/wiki/wiki/White-Paper/5f59d858bf36d6f2f6650f1f30f0b8601574d73>>.

Christidis et al., "Blockchains and Smart Contracts for the Internet of Things", IEEE Access, Special Section on the Plethora of Research in Internet of Things (IoT), vol. 4, pp. 2292-2303, Apr. 23, 2016.

Cachin, "Architecture of the Hyperledger Blockchain Fabric", Jul. 2016, retrieved on Jul. 5, 2018 <<https://pdfs.sernanticscholar.org/f852/c5f3fe649f8a17ded391df0796677a59927f.pdf>>.

Stanciu, "Blockchain based distributed control system for Edge Computing", 2017 21st International Conference on Control Systems and Computer Science , pp. 667-671.

* cited by examiner

DATABASE-CENTERED COMPUTER NETWORK SYSTEMS AND COMPUTER-IMPLEMENTED METHODS FOR CRYPTOGRAPHICALLY-SECURED DISTRIBUTED DATA MANAGEMENT BASED ON ENTROPY AND HAVING A SUPERVISORY NODE

FIELD OF TECHNOLOGY

The subject matter herein generally relates to database-centered computer network systems and computer-implemented methods for cryptographically-secured distributed data management.

BACKGROUND OF TECHNOLOGY

A computer network system may include a group of computer systems and other computing hardware devices that are linked together through communication channels to facilitate communication and resource-sharing among a wide range of users.

SUMMARY OF THE INVENTION

In some embodiments, the present invention provides for an exemplary computer system which includes at least the following components: a network of externally owned presence (EOP) member nodes; i) where each EOP member node is owned by a distinct entity; ii) where the network of externally owned presence (EOP) nodes includes: 1) at least one supervisory EOP member node and 2) a plurality of peer EOP member nodes; iii) where the at least one supervisory EOP member node is configured to generate at least one personalized cryptographic private key for each peer EOP member node; iv) where each personalized cryptographic private key is only known to a corresponding peer EOP member node which controls a secrecy of such personalized cryptographic private key; at least one distributed database, storing a plurality of persistent data objects; and a plurality of self-contained self-executing software containers (SESCs); i) where each SESC includes an independently executable software code which is at least configured to: 1) generate at least one state hash representative at least one current state of at least one persistent data object, 2) perform at least one data action with the at least one persistent data object; and 3) determine that a particular EOP member node has a permission to cause the SESC to perform the at least one data action with the at least one persistent data object based, at least in part on a particular personalized cryptographic private key of the particular EOP member node and at least one attribute associated of the particular EOP member node; and 4) determine that the at least one data action with the at least one persistent data object has been based, at least in part, on at least one explicit policy criteria check to which all EOP member nodes have agreed to follow.

In some embodiments, the plurality of SESCs includes: a plurality of meeting SESCs, where each meeting SESC is at least configured to: obtain current data related to a particular corporate event of a publicly traded company from at least one electronic source associate with at least one EOP member node; perform the at least one explicit policy criteria check associated with at least one of the at least one electronic source, the at least one EOP member node, and the current data; generate at least one meeting state hash representative the current data of the particular corporate event; store the at least one meeting state hash and the current data of the particular corporate event in at least one meeting persistent data object in the at least one distributed database; keep the at least one meeting state hash within the meeting SESC; and generate an output representative of a current state of the particular corporate event.

In some embodiments, each SESC is further configured to generate the at least one SESC state hash based on at least one of the following cryptographic hash functions: SHA-256, Dagger-Hashimoto Hashes, and SHA3.

In some embodiments, the present invention provides for an exemplary computer-implemented method that includes at least the following steps administering a network of externally owned presence (EOP) member nodes; i) where each EOP member node is owned by a distinct entity; ii) where the network of externally owned presence (EOP) nodes includes: 1) at least one supervisory EOP member node and 2) a plurality of peer EOP member nodes; iii) where the at least one supervisory EOP member node is configured to generate at least one personalized cryptographic private key for each peer EOP member node; iv) where each personalized cryptographic private key is only known to a corresponding peer EOP member node which controls a secrecy of such personalized cryptographic private key; administering at least one distributed database, storing a plurality of persistent data objects; and programming a plurality of self-contained self-executing software containers (SESCs); i) where each SESC includes an independently executable software code which is at least configured to: 1) generate at least one state hash representative at least one current state of at least one persistent data object, 2) perform at least one data action with the at least one persistent data object; and 3) determine that a particular EOP member node has a permission to cause the SESC to perform the at least one data action with the at least one persistent data object based, at least in part on a particular personalized cryptographic private key of the particular EOP member node and at least one attribute associated of the particular EOP member node; and 4) determine that the at least one data action with the at least one persistent data object has been based, at least in part, on at least one explicit policy criteria check to which all EOP member nodes have agreed to follow.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

DETAILED DESCRIPTION OF THE INVENTION

Figure 1:
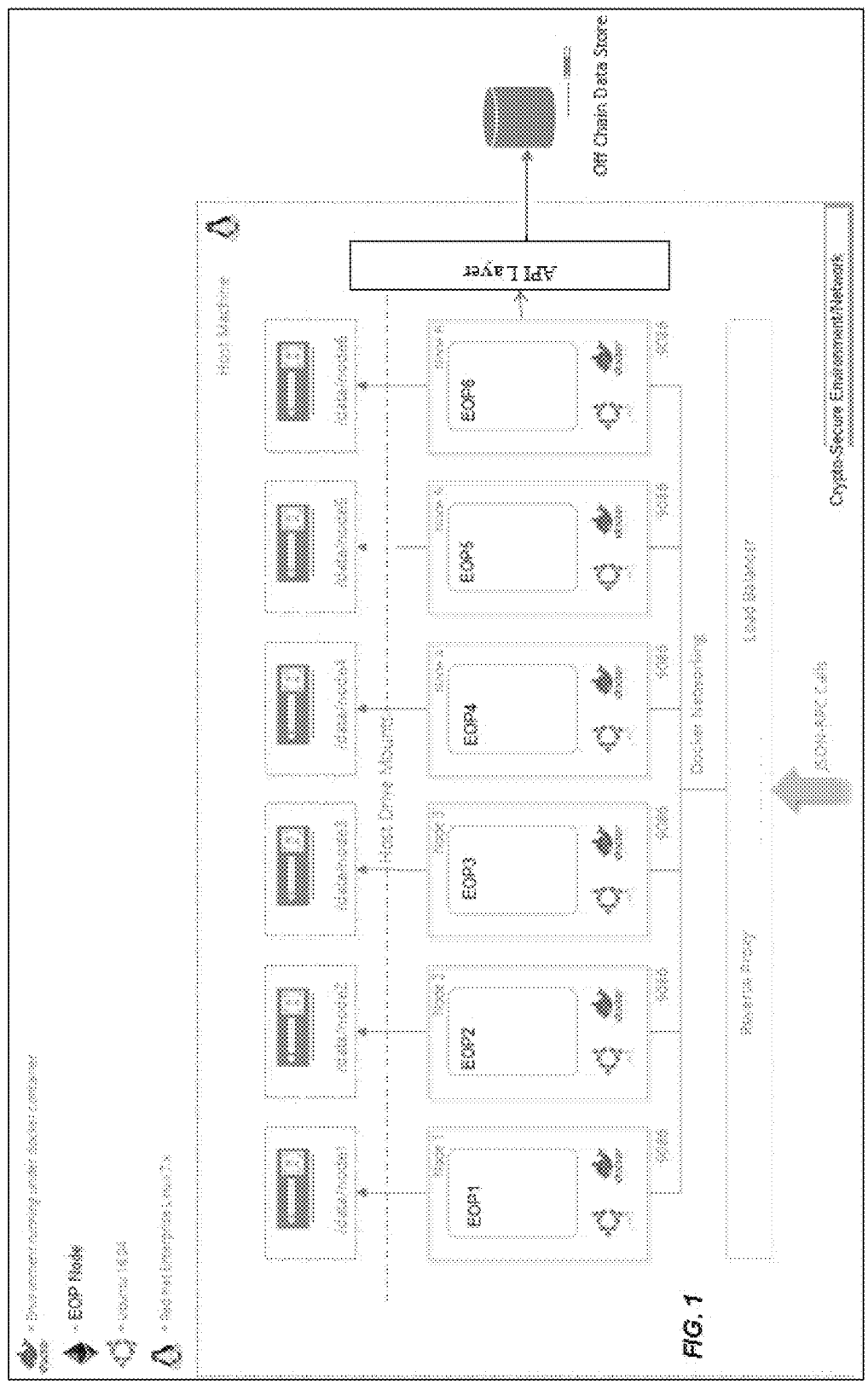
FIGS. 1-22 show flow diagrams and/or certain computer architectures which are representative of some exemplary aspects of the present invention in accordance with at least some principles of at least some embodiments of the present invention.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "runtime" corresponds to any behavior that is dynamically determined during an execution of a software application or at least a portion of software application.

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, the inventive electronic systems are associated with electronic mobile devices (e.g., smartphones, etc.) of users and server(s) in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). In some embodiments, a plurality of concurrent users can be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript, Python, Perl,). The aforementioned examples are, of course, illustrative and not restrictive.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In one example implementation, a multi-processor system may include a plurality of processor chips each of which includes at least one I/O component which is designed to directly connect to photonic components to connect to at least an I/O device. In some embodiments, the I/O device may be a standard interface, such as peripheral component interconnect express (PCIe), universal serial bus (USB), Ethernet, Infiniband, and the like. In some embodiments, the I/O device may include a storage device.

In one example implementation, a multi-processor system may include plurality of photonic components and an off-chip memory. The off-chip memory may be shared by more than one of the processor chips. The off-chip memory may be directly connected to a single processor chip and shared with other processor chips using a global memory architecture implemented by using a processor-to-processor approach. The multi-processor system may also include a cache and a plurality of processor chips each of which includes at least one I/O component which is designed to directly connect to the photonic components to communicate with one or more other processor chips. At least one I/O component of at least one of the processor chips may be configured to use a directory-based cache-coherence protocol. In some embodiments, a cache of at least one of the processor chips may be configured to store directory information. In some embodiments, the off-chip memory may include a DRAM. In some embodiments, directory information may be stored in the off-chip memory and the on-chip cache of at least one of the processor chips. In some embodiments, the multi-processor system may further include a directory subsystem configured to separate the off-chip memory data and the directory information on to two different off-chip memories. In some embodiments, the multi-processor system may further include a directory subsystem configured with some of the subsystem implemented on a high performance chip which is part of the 3D DRAM memory stack. In some embodiments, the multi-processor system may further include a directory subsystem configured to support varying numbers of sharers per memory block. In some embodiments, the multi-processor system may further include a directory subsystem configured to support varying numbers of sharers per memory block using caching. In some embodiments, the multi-processor system may further include a directory subsystem configured to support varying numbers of sharers per memory block using hashing to entries with storage for different numbers of pointers to sharers. In some embodiments, the multi-processor system may further include a directory subsystem configured to use hashing to reduce storage allocated to memory blocks with zero sharers.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Illustrative Examples of the Inventive Cryptographically-Secure Permissioned Distributed Database-Centered Computer System/Network Architecture In some embodiments, the present invention provides an exemplary inventive cryptographically-secure permissioned distributed database-centered computer system that may be programmed/configured for distributed data management of cryptographically secure single source of truth and immutable records. In some embodiments, the exemplary inventive cryptographically-secure permissioned distributed database-centered computer system may be programmed/configured to support an exemplary inventive crypto-secure distributed environment/network having a plurality of nodes (CSD network). In some embodiments, the exemplary inventive cryptographically-secure permissioned distributed database-centered computer system may be controlled by at least one supervising authority which would have read/write privileges. In some embodiments, the exemplary inventive cryptographically-secure permissioned distributed database-centered computer system may be executed as a continuously evolving membership of authorized node members, referenced herein as externally owned presence nodes (EOP nodes). In some embodiments, the exemplary inventive cryptographically-secure permissioned distributed database-centered computer system may be programmed/configured such that only the supervising authority has a read/write node (supervisory EOP member node) and other members/participants may access via a specialized graphical user interface (GUI) such as but not limited to, an on-line Web GUI and/or a mobile application GUI (peer EOP member nodes). In some embodiments, the exemplary inventive cryptographically-secure permissioned distributed database-centered computer system may be programmed/configured to allow members/participants to setup trusted/authorized EOP nodes, utilizing one or more digital signature cryptographic algorithms such as, but not limited to, Elliptic Curve Digital Signature Algorithm (ECDSA) based on a private/public key pair. In some embodiments, the private key may be stored only with the participant/member (a peer EOP member node) and the supervisory EOP member node does not have access to the private key.

In some embodiments, the managing authority is an entity that facilitates the functioning of the exemplary inventive cryptographically-secure permissioned distributed database-centered computer system by facilitating the creation of digital identity for EOP-owned participants which may access the exemplary inventive cryptographically-secure permissioned distributed database-centered computer system via any suitable computer venues such as but not limited to, a mobile portal, an on-line/Web portal, and other similar suitable interface(s).

In some embodiments, the exemplary inventive cryptographically-secure permissioned distributed database-centered computer system may be programmed/configured to facilitate in setting up self-contained self-executing software containers (SESCs) representing a state of a particular data. Each SESC may contain the particular data and particular independent software code (ISC) which would be executed on the particular data when particular transaction(s) (e.g., data message(s), etc.) are/is directed to particular SESC(s).

In some embodiments, the exemplary inventive cryptographically-secure permissioned distributed database-centered computer system may be programmed/configured so that data residing in distributed manner across nodes may be read only when a particular relevant ISC is being executed by the exemplary inventive cryptographically-secure permissioned distributed database-centered computer system. For example, a particular ISC may check the identity of the invoker and, then, may retrieve only the data that the invoker is entitled to receive so that to ensure that the data privacy and confidentiality can be maintained.

In some embodiments, an exemplary suitable cryptosecure environment/network that the exemplary inventive cryptographically-secure permissioned distributed database-centered computer system may be programmed/configured to support is the Ethereum-like environment (Ethereum Foundation (Stiftung Ethereum), Zug, Switzerland). In an Ethereum-based embodiment, each SESC is implemented as an Ethereum contract (or smart contract).

In some embodiments, an exemplary suitable cryptosecure environment/network that the exemplary inventive cryptographically-secure permissioned distributed database-centered computer system may be programmed/configured to support is the Hyperledger Fabric (The Linux Foundation, San Francisco, Calif.). In a Hyperledger Fabric-based embodiment, each SESC is implemented as a chaincode.

Illustrative Examples of Utilizing the Inventive SESCs for Managing Shareholder Meeting-Related Activities In some embodiments, the managing authority is an entity which at least manages certain aspects related to publicly traded financial instruments and/or publicly traded companies (e.g., companies traded on New York Stock Exchange (NYSE), National Association of Securities Dealers Automated Quotations (NASDAQ), etc.) In one example, the managing authority may perform at least one of the following: distribute shareholder/investor communications (including, but not limited to, proxy materials, prospectuses, accounting statements, issuer communications, broker communications, and other similarly suitable information); manage corporate governance activities (including, but not limited to, collecting votes on corporate matters/events), clear trading transactions, and other similarly suitable activities. In some embodiments, the EOP node-owned members of the exemplary inventive cryptographically-secure permissioned distributed database-centered computer system may be at least one of issuers, issuer agents, custodians, brokers, banks, pension funds, mutual funds, hedge funds, investors, government agencies, regulatory agencies, and any combination thereof.

For example, in case of managing corporate activities, exemplary ISC of an exemplary SESC may be programmed to store various data such as, but not limited to, meeting/agenda, ballot, entitlements, voting and vote confirmation data in the distributed database of the exemplary inventive cryptographically-secure permissioned distributed database-centered computer system. In some embodiments, the particular SESC may be programmed to be controlled by an EOP member node with a certain address.

In some embodiments, the exemplary inventive cryptographically-secure permissioned distributed database-centered computer system may be programmed/configured to operate based on an operational consensus among all EOP member nodes. For example, as referenced herein, the consensus is directed to the full-circle verification of the correctness of a set of data stored in instances of the distributed database shared among the EOP member nodes and/or functions being executed within the inventive cryptosecure environment of the present invention. For example, the exemplary inventive cryptographically-secure permissioned distributed database-centered computer system may be programmed/configured to support the consensus by verifying that activities taken place within the inventive crypto-secure environment of the present invention have met the explicit policy criteria checks. For example, the verification may include utilizing endorsement policies to dictate which specific EOP member nodes should endorse certain transaction type/class. In some embodiments, the verification may include employing global management SESC(s) to ensure that these endorsement policies are enforced and upheld. In some embodiments, prior to commitment, the EOP member node may employ these global management SESC(s) to make sure that enough endorsements are present, and that they were derived from the appropriate entities. In some embodiments, the exemplary inventive cryptographically-secure permissioned distributed database-centered computer system may be programmed/configured to perform a versioning check during which all EOP member nodes or at least all relevant EOP member node agree or consented upon the current state of the distributed database before any new data is added to the distributed database.

In some embodiments, contemporaneously with the data verification, the exemplary inventive cryptographically-secure permissioned distributed database-centered computer system may be programmed/configured to perform ongoing identity verifications in all directions of the transaction flow. For example, access control lists may be implemented on hierarchal layers of the network (ordering service down to channels), and payloads may repeatedly signed, verified and/or authenticated as transaction proposals pass through the different architectural components.

In some embodiments, the exemplary inventive cryptographically-secure permissioned distributed database-centered computer system may be programmed/configured to generate a plurality of specialize GUIs based on a type of EOP node participant/member so that the particular EOP node participant/member may invoke particular ISC(s) of particular SESC(s) through one or more specialized GUIs. For example, in case of the managing corporate activities/events, such specialize GUIs may be, but not limited to:
1. Issuer View GUI: the issuer view GUI may be displayed when an issuer/issuer agent, owning a particular EOP, logins and may provide, but not limited to, insights into meeting information along with the timeline along with daily voting trends, quorum tracker, voting % at each proposal level;
2. Investor View GUI: the investor view GUI may be displayed to an institutional investor, owning a particular EOP, and may provide details regarding all the positions held by the institutional investor across various custodians and/or, including but not limited to, voting information corresponding to the positions held; and
3. Managing authority View GUI: this managing authority view GUI may provide an overall tracking for each corporate activity/event, (e.g., the meeting timeline, daily voting trends, quorum tracker, entitlement details and/or voting % at each proposal level, etc.).

In some embodiments, the exemplary inventive cryptographically-secure permissioned distributed database-centered computer system may be programmed/configured to allow EOP node participants/members to have a shared access to the distributed database based on access and entitlement principles such as, but not limited to:
  i) read only node access,
  ii) read/write node access, and
  iii) a non-node client application access.

For example, in case managing corporate activities/events, the exemplary inventive cryptographically-secure permissioned distributed database-centered computer system may be programmed/configured to allow:

i) investors to access only to their vote entitlements;
ii) custodians to access only to the vote entitlements of their investor clients; and
iii) issuers to access only to vote details without access to any underlying investor details; and
iv) a managing authority to access all data provided managed by the exemplary inventive cryptographically-secure permissioned distributed database-centered computer system.

In some embodiments, the exemplary inventive cryptographically-secure permissioned distributed database-centered computer system may be programmed/configured to set-up a cryptographically-secure digital identity for each EOP node participant/member (e.g., human personas, mining nodes, automated agents, etc.). For example, an exemplary cryptographically-secure digital identity can be encrypted by utilizing the ECDSA. In some embodiments, the exemplary inventive cryptographically-secure permissioned distributed database-centered computer system may be programmed/configured to allow EOP node participants/members to use public/private key cryptography technique(s) to sign each electronic communication and/or electronic data exchange between electronic compute devices of participants/members and/or the exemplary inventive cryptographically-secure permissioned distributed database-centered computer system so that the exemplary inventive cryptographically-secure permissioned distributed database-centered computer system may be capable of securely validating the identity of a data sender.

In some embodiments, the exemplary inventive cryptographically-secure permissioned distributed database-centered computer system may be programmed/configured to distribute to a particular node (e.g., a EOP node particular participant/member) a respective logical shard of data from the staging database which is relevant to the particular node based, at least in part, on one or more characteristics of such node and/or one or more characteristics of the EOP node particular participant/member associated with such node.

In some embodiments, the exemplary inventive cryptographically-secure permissioned distributed database-centered computer system may be programmed/configured to utilize one or more distributed databases. In some embodiments, the exemplary inventive cryptographically-secure permissioned distributed database-centered computer system may be programmed/configured to utilize a NonSQL MarkLogic® type database (MarkLogic Corporation, 999 Skyway Road, Suite 200 San Carlos, Calif. 94070) as a staging database to aggregate and store all incoming data in numerous distinct formats from numerous distinct electronic sources. In some embodiments, the exemplary incoming data may be related to corporate events of publicly traded companies and/or publicly traded financial instruments. For example, in case of the corporate events of publicly traded companies, the exemplary inventive cryptographically-secure permissioned distributed database-centered computer system may be programmed/configured to store data regarding meeting, agenda, voting, and/or entitlement data in cryptographically secure hashes, as shown in FIG. 1. For example, the exemplary inventive cryptographically-secure permissioned distributed database-centered computer system may be programmed/configured to utilize one or more cryptographic hash functions (e.g., SHA-256, Dagger-Hashimoto Hashes, SHA3, and others) to encode predetermined data elements (e.g., key data elements) which may be representative of meeting data, agenda data, entitlement data and/or voting data, and, then, store only hashes themselves in one or more separate distributed databases (crypto-secure distributed environment) that would be accessed by ISCs of SESCs upon instruction(s) from EOP-node participants/members.

FIG. 1 shows an exemplary architecture of an exemplary crypto-secure permissioned environment/network that the exemplary inventive cryptographically-secure permissioned distributed database-centered computer system may be programmed/configured to support. For example, FIG. 1 shows six independent EOP node entities. For example, each EOP node may be programmed to operate as a Docker container (Docker, Inc., CA, US) which is a lightweight, stand-alone, executable package of a piece of software that includes everything needed to run it: code, runtime, system tools, system libraries, and settings. In addition, the exemplary inventive cryptographically-secure permissioned distributed database-centered computer system may include a server to handle, for example, but not limited to, external JSON-RPC requests. For example, an exemplary server may be, but not limited to, a NGINX-type of server (NGINX Inc., CA, US) which is a HTTP server and reverse proxy, as well as an IMAP/POP3 proxy server.

In some embodiments, the exemplary inventive cryptographically-secure permissioned distributed database-centered computer system may be programmed/configured to allow each EOP node participant to create and control own private key(s) after such EOP node participant is registered with the exemplary inventive cryptographically-secure permissioned distributed database-centered computer system.

In some embodiments, the exemplary inventive cryptographically-secure permissioned distributed database-centered computer system may be programmed/configured to allow an EOP node participant who is a custodian of particular asset(s) to register the asset(s) within the inventive crypto-secure environment so that the asset(s) can be traded within the inventive environment.

Figure 2:
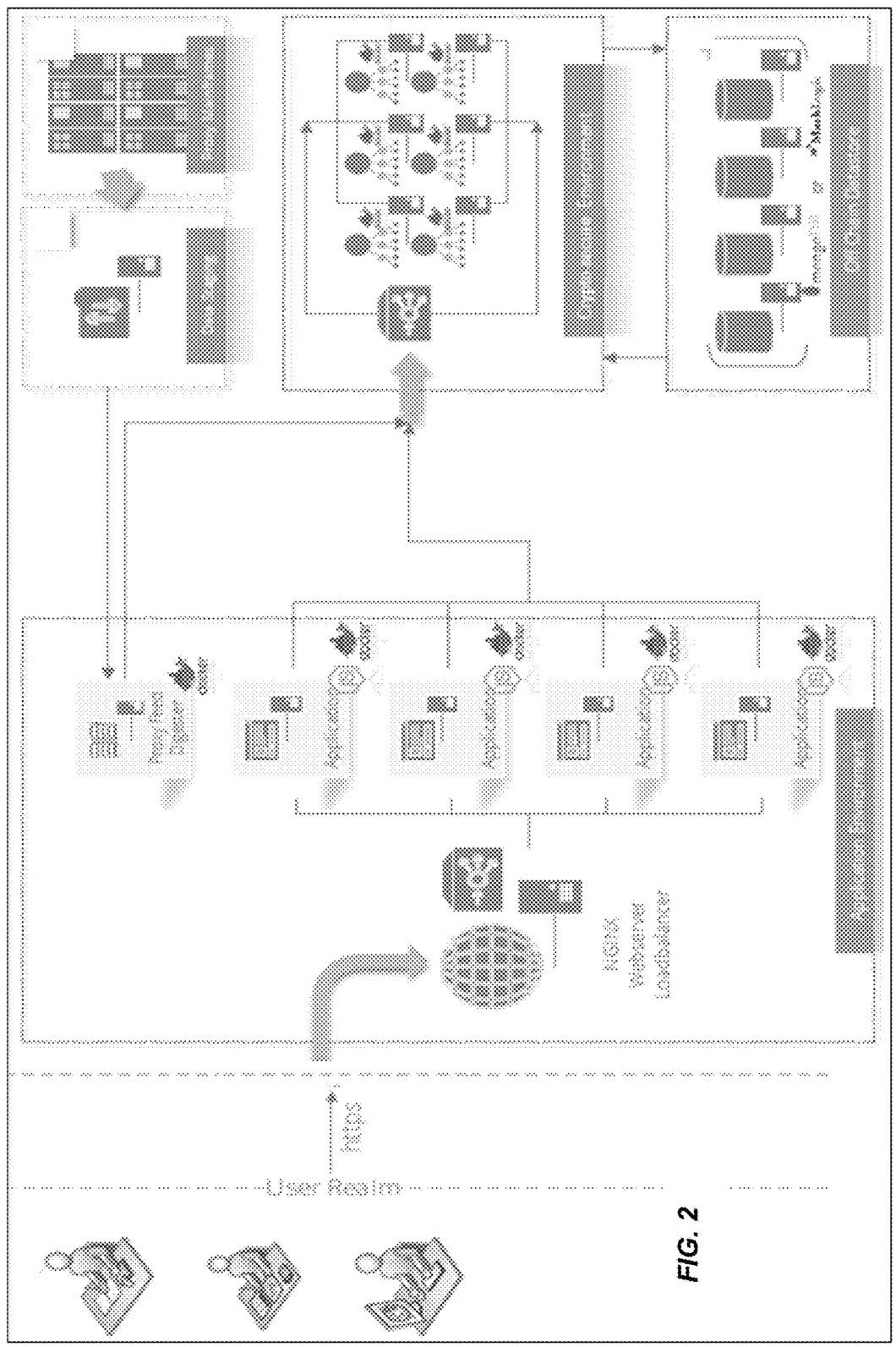

In some embodiments, the exemplary inventive cryptographically-secure permissioned distributed database-centered computer system may be programmed/configured to link the data in the staging database to the corresponding secure hash state(s) of the corresponding ISC(s) of the corresponding SESC(s) in the crypto-secure distributed database environment which stores the hashes of key data elements for the meeting, agenda, entitlement and/or voting information, as shown FIG. 2. As shown FIG. 2, the exemplary inventive cryptographically-secure permissioned distributed database-centered computer system may be programmed/configured to include one or more databases (e.g., database(s) identified as "Off-Chain Datastore" in FIG. 2) that may store additional details (non-key data elements) for the meeting, voting, agenda, and/or entitlement.

In some embodiments, the exemplary inventive cryptographically-secure permissioned distributed database-centered computer system may be programmed/configured utilizing Docker software container platform (Docker, Inc., San Francisco, Calif.) which may run on a Linux operating system such as, but not limited to, Ubuntu (Canonical Group Limited, London, UK). For example, each Docker software container may correspond to a particular node which may be associated with or correspond to a particular EOP node participant/member.

Figure 3:
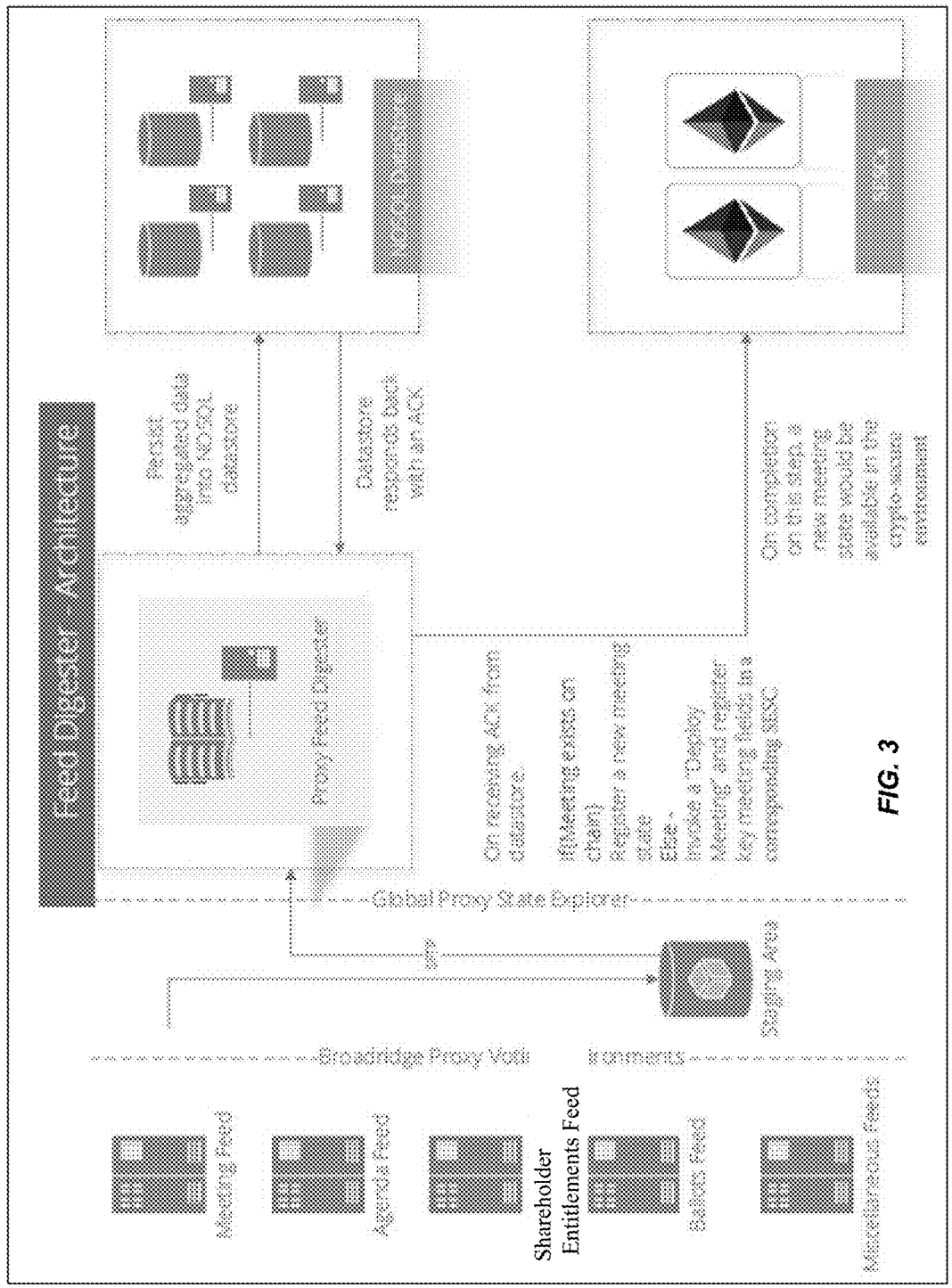

FIG. 3 shows an exemplary architecture that the exemplary inventive cryptographically-secure permissioned distributed database-centered computer system may be programmed/configured to have for managing the corporate activities/events. In FIG. 3, SESCs correspond to cryptosecure hash states of the key data elements for the meeting, agenda, entitlement and/or voting information. For example, a particular SESC may store the state of a particular meeting which may include a meeting agenda, cutoffs dates, present ballot votes, etc.).

Figure 4:
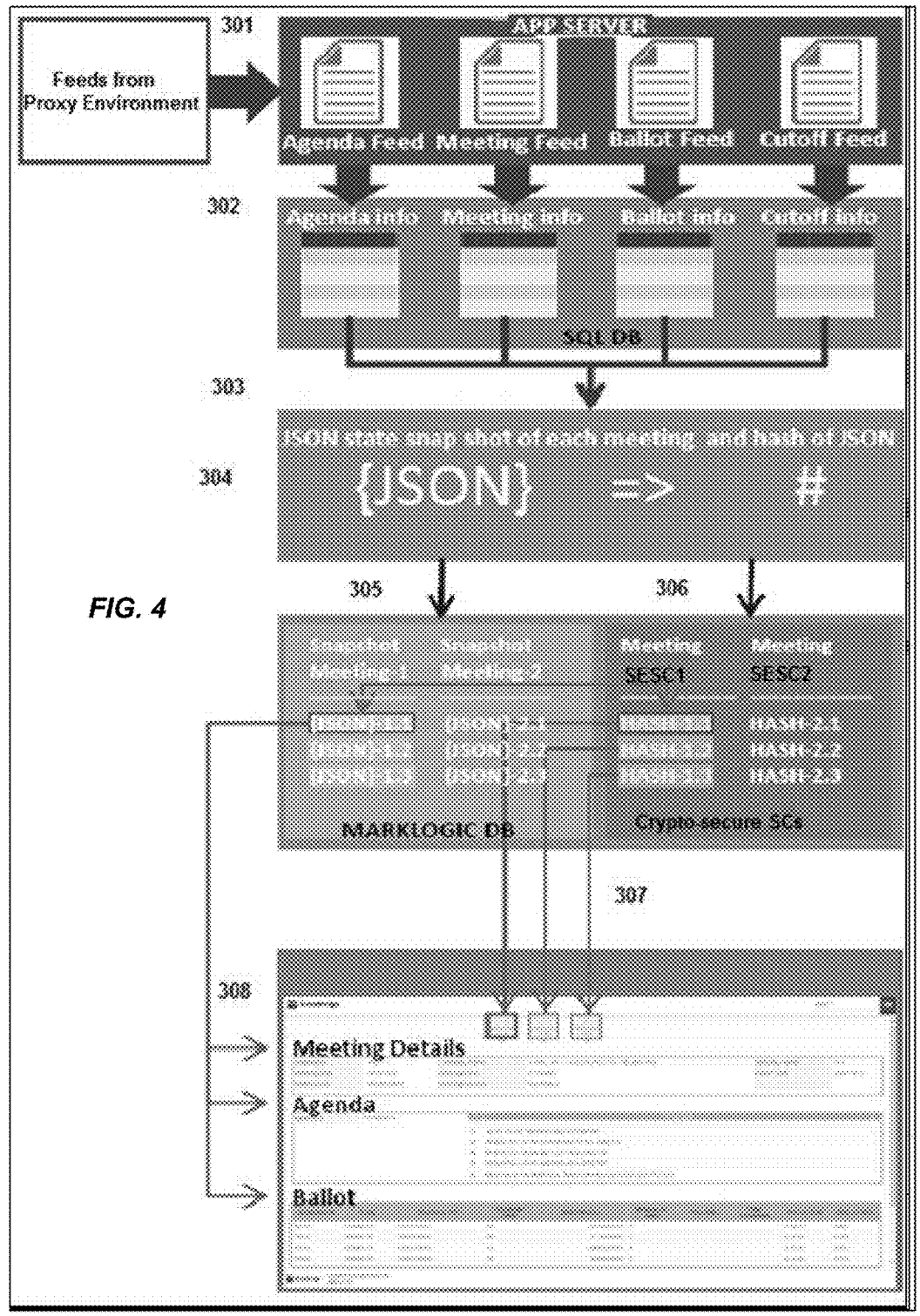

FIG. 4 shows an exemplary workflow that the exemplary inventive cryptographically-secure permissioned distributed database-centered computer system may be programmed/configured to execute for managing the corporate activities/events. For example, at step 301, the exemplary inventive cryptographically-secure permissioned distributed database-centered computer system may be programmed/configured to pull meeting feeds from one or more electronic data sources in an exemplary proxy voting environment and to hold them in a temporary memory (e.g., memory buffer) of at least one application server (App Server).

At step 302, the exemplary inventive cryptographically-secure permissioned distributed database-centered computer system may be programmed/configured to analyze each feed (e.g., agenda, meeting, ballot, sub custodian, etc.) and populate respective data structure(s) (e.g., tables in a SQL DB).

At step 303, the exemplary inventive cryptographically-secure permissioned distributed database-centered computer system may be programmed/configured to associate data specific to each meeting across all feed tables in, for example, the exemplary SQL database which represents current snap shot of all details at a particular time (e.g., during a day, a month, etc.) for the respective meeting.

At step 304, the exemplary inventive cryptographically-secure permissioned distributed database-centered computer system may be programmed/configured to generate a plurality of data objects, such as but not limited to, a plurality of JSON (JavaScript Object Notation) objects which each may contain at least one data array representing, for example, meeting-agenda-proposal-voting details. In some embodiments, the exemplary inventive cryptographically-secure permissioned distributed database-centered computer system may be programmed/configured to calculate a hash digest of every JSON object which represents a current state of a particular meeting and is associated with the respective JSON object.

At step 305, the exemplary inventive cryptographically-secure permissioned distributed database-centered computer system may be programmed/configured to store each data object (e.g., each JSON object) and its respective hash digest in a complete data database (e.g., Off-Chain DBs of FIG. 3 which may be in the form of MarkLogic DB).

At step 306, the exemplary inventive cryptographically-secure permissioned distributed database-centered computer system may be programmed/configured to also store the hash of each data object (e.g., each JSON object) as a SESC within the crypto-secure environment.

At step 307, when updated data is received for a particular meeting (e.g., change in a proposal, new votes being casted, change in an agenda, etc.), the exemplary inventive cryptographically-secure permissioned distributed database-centered computer system may be programmed/configured to generate a new data object (e.g., a new JSON object) with its respective hash, and then they would be stored in both: the complete data database (e.g., Off-Chain DBs of FIG. 3 which may be in the form of MarkLogic DB), and the crypto-secure distributed database/environment as a new SESC.

At step 308, every time a particular meeting would be accessed via a specialized GUI (for example, by submitting a meeting assigned identifier (e.g., MeetingID), the exemplary inventive cryptographically-secure permissioned distributed database-centered computer system may be programmed/configured to communicate with the distributed crypto-environment (e.g., via a Web3 API call) with corresponding SESC for that meeting, query a list all hashes for that meeting (e.g., the respective JSON object) which represent a chronological (timestamped) representation of the particular meeting at a particular time period.

In some embodiments, the exemplary inventive cryptographically-secure permissioned distributed database-centered computer system may be programmed/configured to validate each API call and, upon the validation, convert the API request into a particular data object request (e.g., a valid JSON-RPC transaction) and executes the request against the crypto-secure distributed database.

In some embodiments, the exemplary inventive cryptographically-secure permissioned distributed database-centered computer system may be programmed/configured to receive data representative of shareholder voting positions from numerous electronic sources (e.g., banks, brokers, custodians, transfer (issuer) agents/solicitors, depositories, and others). In some embodiments, the exemplary inventive cryptographically-secure permissioned distributed database-centered computer system may be programmed/configured to manage create, read and/or insert SESC capabilities based on one or more characteristics associated with each EOP node participant. For example, a particular SESC may contain the exemplary independent software code (ISC) which determines, upon execution, which EOP-owned participant may have access rights and to what extent (e.g., read-only, read/write, create/read/write, etc.). For example, the exemplary inventive cryptographically-secure permissioned distributed database-centered computer system may be programmed/configured to allow a computer system associated with a broker-dealer and/or a custodian (e.g., a financial institution holding shareholders' stock) to specify, via SESCs, shareholder entitlements. For example, the exemplary inventive cryptographically-secure permissioned distributed database-centered computer system may be programmed/configured to allow to a computer system associated with a transfer (issuer) agent to confirm, via SESCs, shareholder entitlements and/or voting instructions.

In some embodiments, the exemplary inventive cryptographically-secure permissioned distributed database-centered computer system may be programmed/configured to generate dynamic notifications (through SESCs) to interested party(ies) (e.g., EOP node participant(s)) to at least one of:

1) inform regarding a new meeting state (e.g., a new meeting SESC),
2) instruct to update meeting-related data, and
3) instruct to take an action (e.g., confirm consent to the correctness of data).

In some embodiments, the exemplary inventive cryptographically-secure permissioned distributed database-centered computer system may be programmed/configured to allow numerous EOP node participants to review and/or approve, via SESCs, the data stored in the data objects (e.g., JSON objects).

In some embodiments, the exemplary inventive cryptographically-secure permissioned distributed database-centered computer system may be programmed/configured to synchronize, among EOP node participants, the exemplary crypto-secure distributed SESCs database/environment by utilizing at least one cryptographically secured peer-to-peer communication and/or at least one mathematical consensus algorithm (e.g., Phase King algorithm, a cryptographic proof-of-work algorithm, multi-agent system-type algorithm, etc.).

Illustrative Examples of Utilizing the Inventive SESCs for Managing Shareholder Meeting-Related Activities In some embodiments, when data for a new meeting is received, the exemplary inventive cryptographically-secure permissioned distributed database-centered computer system may be programmed/configured to send a particular "key" data to generate a corresponding SESC. For example, the "key" data may include data units representative of: record date, CUSIP, meeting data, agenda, etc. In some embodiments, for example, after a primary SESC for the meeting would be created, the exemplary inventive cryptographically-secure permissioned distributed database-centered computer system may be programmed/configured to generate one or more additional SESCs representing, for example, "key" data (delineated by a particular interest party). For example, the exemplary inventive cryptographically-secure permissioned distributed database-centered computer system may be programmed/configured to allow transfer (issuer) agents (the EOP node participants) to create SESCs that may contain voting entitlements for their issuer clients' meetings. In some embodiment, a separate SESC may be generated for each entitlement.

Table 1 shows a data schema for an illustrative meeting SESC.

TABLE 1 peMeetingID : Int
recordDate : date(YYYY-MM-DD)
meetingDate : date(YYYY-MM-DD)
cusip9 : char(9) [JSON Array of cusip9]
eventType : char(50)
service : char(20)
status : char (20)
agenda [JSON array]
    agendaNbr : varchar(6)
    committeeTypeCd : char(1)
    proposals [JSON array]
        proposalNumber : number(3,0)
        proposalclass : char(6)
        propDisplayLabel : char(5)
        proposalText: varchar(1500)
        propTypeCd : char(1)
        mgmtRec : char(1)
        defltRec : char(1)
        director [JSON array]
            directorNumber : number(3,0)
            directorName : varchar (64)

Table 2 shows a data schema for an illustrative bank/broker SESC which is related to the meeting SESC of Table 1.

TABLE 2

EVENT ID (e.g., peMeetingID)
long : decimal(12,0),
voteable : decimal(12,0),
tabulation : decimal(12,0),
confirm : char(1)

In some embodiments, each SESC may have an ISC which may be configured, upon self-execution, to launch an event to retrieve particular data from desired computer system(s) which would be programmed/configured to "listen" for a particular inquiry from the respective SESC. In turn, the "listener" may be programmed/configured to respond with the most current data. Table 3 provides software schema representative of communication protocol logics of particular "listener" computer systems.

TABLE 3

Listen to the event hub
Switch (Event Type)
    1. Case "Event Update request"
    Async call getEventUpdates
        Parameters
            peMeetingID : Int
            brSecureToken (can be in HTTP Header) : char
            originator (can be in HTTP Header) : char
    2. Case "Bank/Broker Entitlement Update request"
    Async call getBBEntitlementUpdates
        Parameters
            peMeetingID : Int
            companyID : char(6)
            brSecureToken (can be in HTTP Header) : char
            originator (can be in HTTP Header) : char
    3. Case "Transfer Agent Entitlement Update request"
    Async call getTAEntitlementUpdates
        Parameters
            peMeetingID : Int
            companyID : char(6)
            brSecureToken (can be in HTTP Header) : char
            originator (can be in HTTP Header) : char
    4. Case "Depository Entitlement Update request"
    Async call getDepEntitlementUpdates
        Parameters
            peMeetingID : Int
            participantID : char(6)
            brSecureToken (can be in HTTP Header) : char
            originator (can be in HTTP Header) : char In some embodiments, the exemplary inventive cryptographically-secure permissioned distributed database-centered computer system may be programmed/configured to exchange data/action between one or more third-party crypto-secure distributed database environments.

In some embodiments, the exemplary inventive cryptographically-secure permissioned distributed database-centered computer system may be programmed/configured to manage SESCs configured for post-trade processing (e.g., clearing and settlement, stock recordation, etc.).

In some embodiments, the exemplary inventive cryptographically-secure permissioned distributed database-centered computer system may be programmed/configured to manage SESCs configured for at least one of the following: sharing of positions across interested parties in the proxy voting process and administering non-proxy voting (e.g., electoral voting).

In some embodiments, the exemplary inventive cryptographically-secure permissioned distributed database-centered computer system may be programmed/configured to execute to update the existing meeting data object (e.g., an existing meeting JSON object for a particular corporate meeting) via an existing corresponding SESC which result a new current SESC being representative of the current state of the updated data object (e.g., the updated meeting JSON object).

In some embodiments, the exemplary inventive cryptographically-secure permissioned distributed database-centered computer system may be programmed/configured to retrieve the current data from the current meeting data object (e.g., the current meeting JSON object) via the current corresponding SESC.

In some embodiments, the exemplary inventive cryptographically-secure permissioned distributed database-centered computer system may be programmed/configured to perform at least one of the following:

i) reconciling votes received/tabulated to entitlement records;
ii) performing meeting analytics to track progress, quorum, etc.; and
iii) confirming the acceptance of vote instructions.

Figure 5:
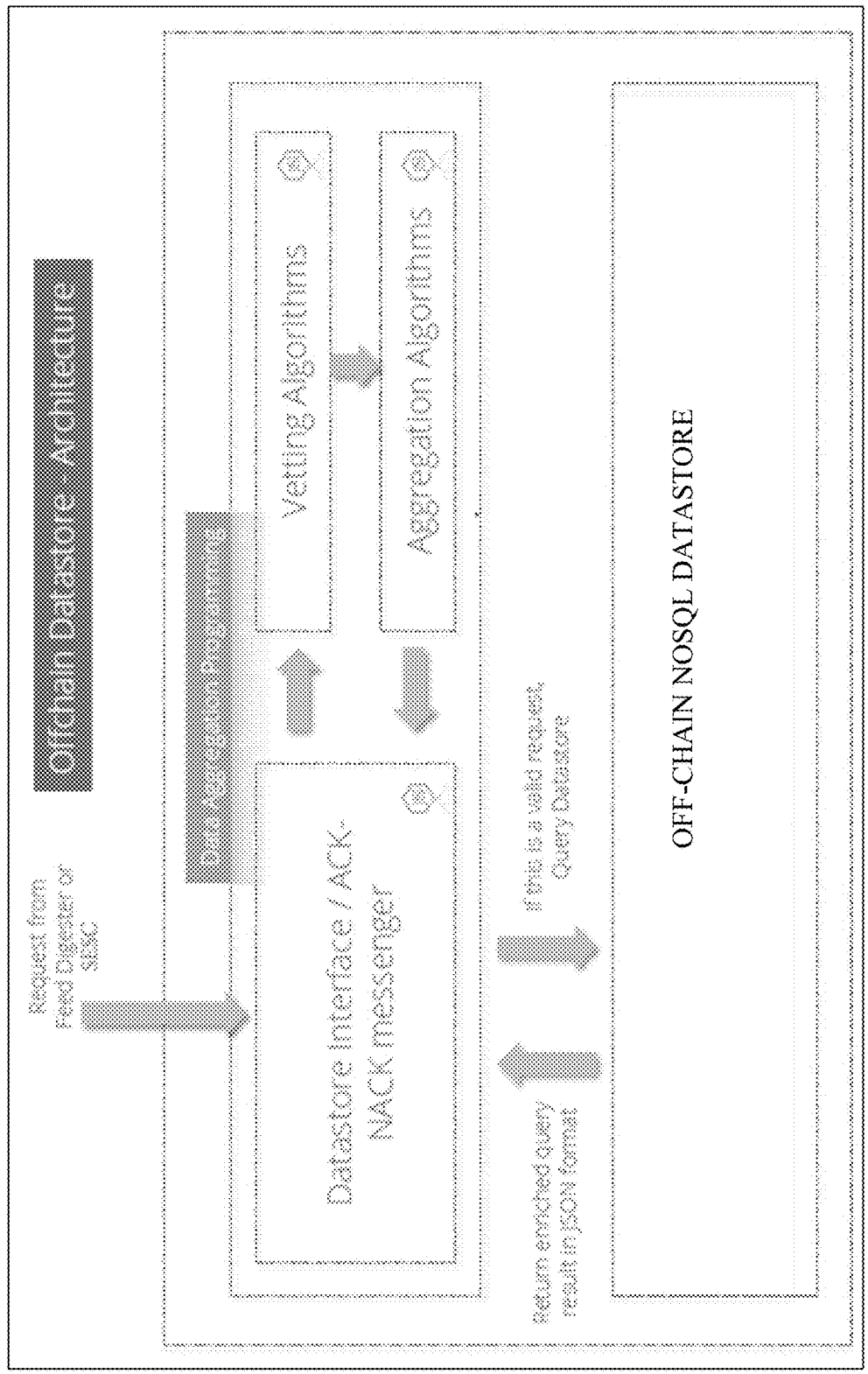

FIG. 5 shows a snapshot of an exemplary diagram of an inventive workflow that the exemplary inventive cryptographically-secure permissioned distributed database-centered computer system may be programmed/configured to store and retrieve data related to a particular meeting data object (e.g., a meeting JSON object stored within an exemplary persistent datastore) via a request from data feed staging database (feed digester) and/or a corresponding SESC. In some embodiments, the exemplary inventive cryptographically-secure permissioned distributed database-centered computer system may be programmed/configured to utilize at least one of vetting algorithm(s) and aggregation algorithm(s) to check requests being transmitted to the distributed database of persistent data objects and/or responses generated by the distributed database of persistent data objects. In some embodiments, as detailed herein, the exemplary persistent datastore is distributed among computer systems of EOP nodes.

Figure 6:
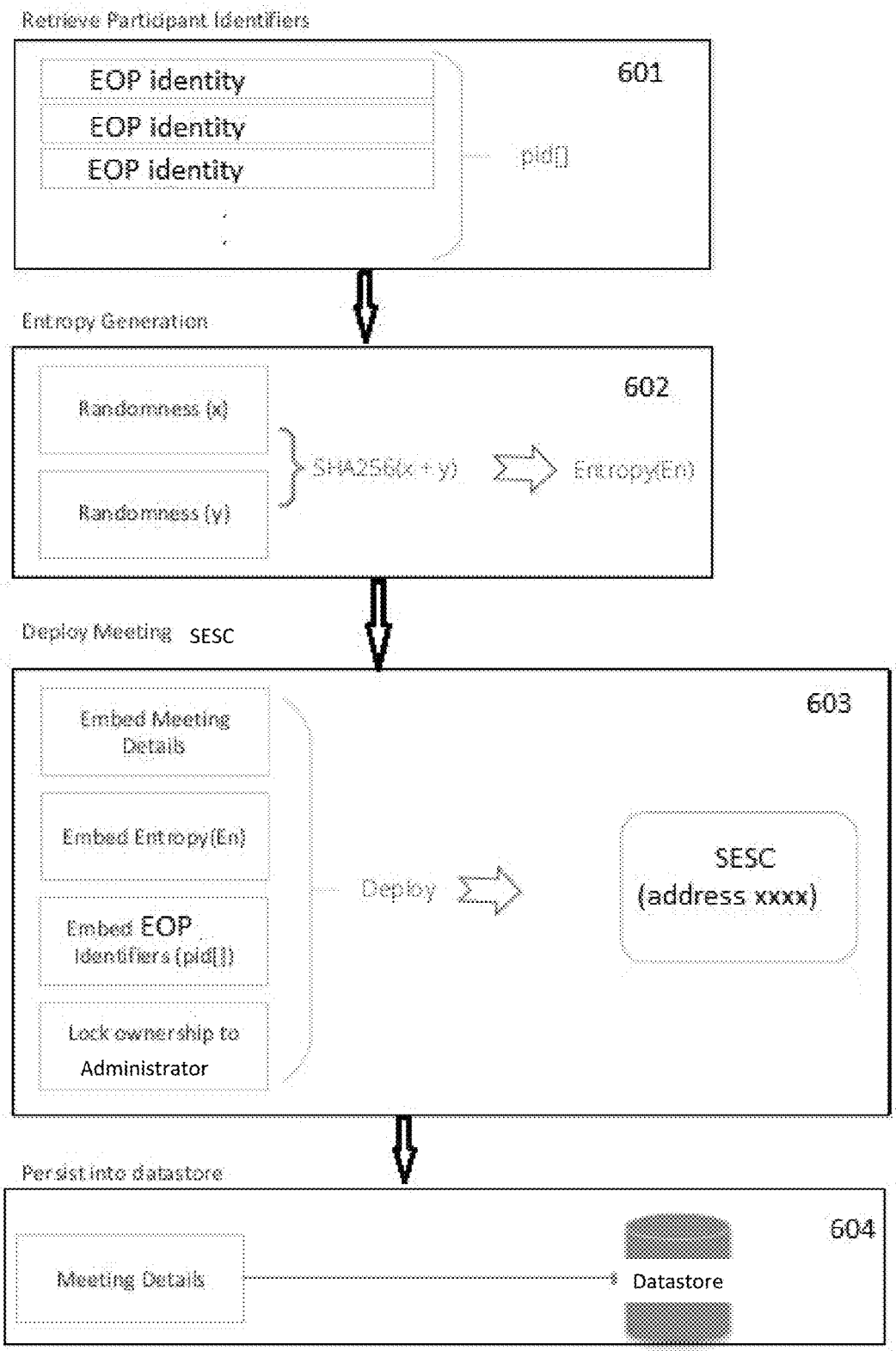

FIG. 6 shows a snapshot of a diagram of a workflow for an exemplary aggregation algorithm that may be utilize to deploy and store a particular meeting within the exemplary inventive cryptographically-secure permissioned distributed database-centered computer system in accordance with at least some embodiments of the present invention. Specifically, at step 601, the exemplary deployment may involve gathering EOP identities by one or more particular computers of the exemplary inventive cryptographically-secure permissioned distributed database-centered computer system (e.g., computer(s) associated with a particular EOP node) to generate an array of personal identifiers associated with one or more particular EOP(s). At step 602, the exemplary deployment may involve an entropy for encoding the meeting information. At step 603, an exemplary meeting deployment SESC may be utilized to encode/generate a meeting specific SESC based at least in part on four inputs identified in block 603 of FIG. 6. At step 604, the generated meeting specific SESC is being stored in one or more datastores of the exemplary inventive cryptographically-secure permissioned distributed database-centered computer system.

Figure 7:
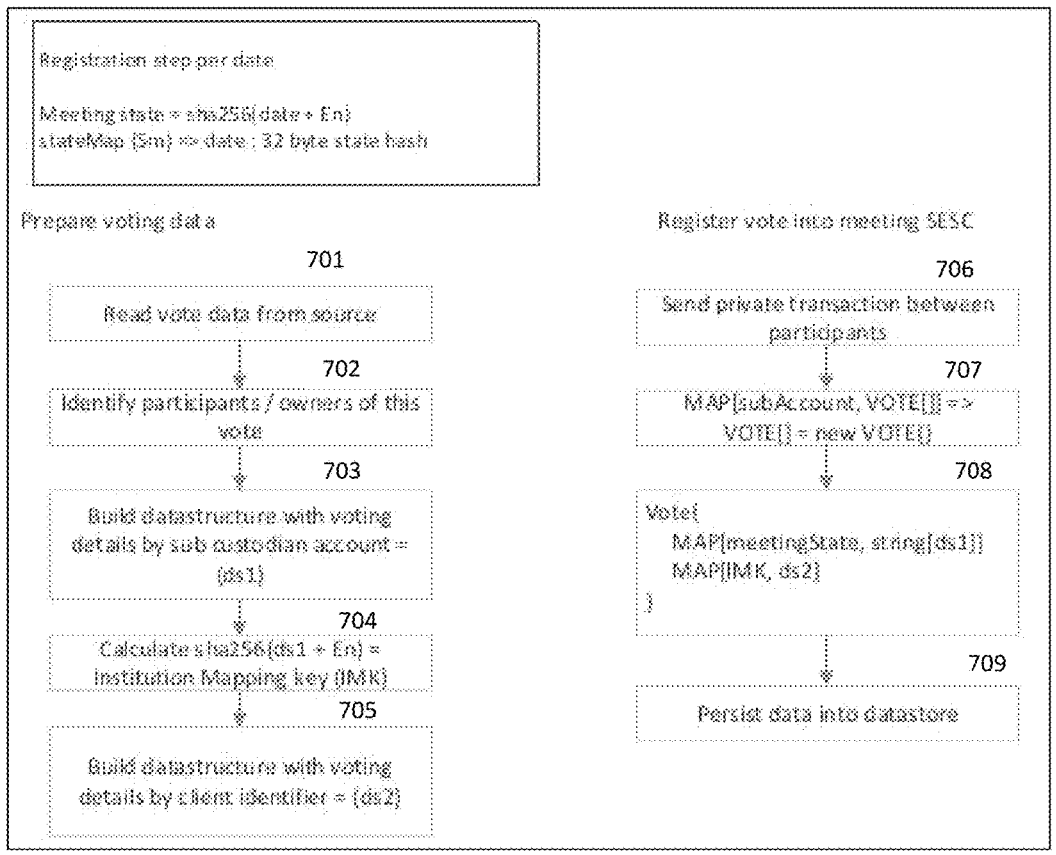

FIG. 7 shows a snapshot of a diagram of a workflow for an exemplary voting verification and registration algorithm that may be utilized to verify and register meeting votes utilizing an exemplary meeting specific SESC in accordance with at least some embodiments of the present invention. For example, in accordance with steps 701-705, an exemplary EOP node computer may be configured to obtain the vote data and process the acquired vote data to be store via a particular data structure. Further, in accordance with steps 706-709, the exemplary EOP node computer may be configured to register the verified vote data into a related meeting SESC. In some embodiments, during the vote registration process, the exemplary EOP node computer may be configured to handle at least two types of private transactions:
1) private transactions between Administrator, Issuer, Custodian(s), and/or Subcustodian(s) whose transaction payload may contain voting data without identifying information of the source of the voting data (e.g., lacking ClientID and/or InstitutionId); and
2) private transactions between Administrator and Custodian(s) whose transaction payload may contain voting data with identifying information of the source of the voting data (e.g., with ClientID and/or InstitutionId).

Figure 8:
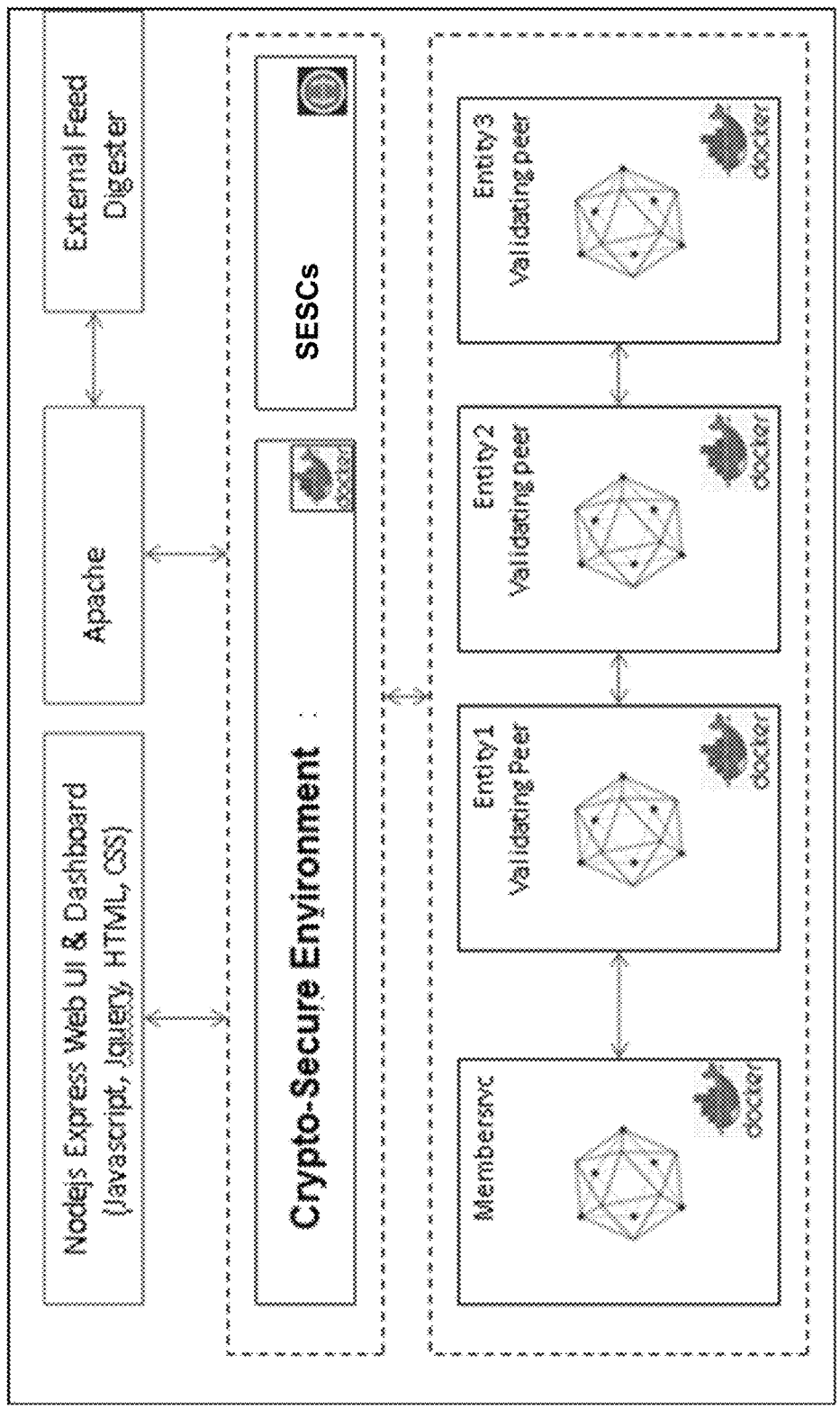

FIG. 8 shows a snapshot of an exemplary diagram of an inventive architecture that the exemplary inventive cryptographically-secure permissioned distributed database-centered computer system. For example, an EOP node participant, identified as "Membersrvc" may be programmed/configured to facilitate the inventive permissioned network/environment by being an administrator for entity and user setup. In FIG. 6, each EOP node participant/entity may have an electronic identity which is represented by a corresponding "Entity Validating peer." For example, in some embodiments, the "Membersrvc" EOP may be responsible for hosting nodes ("Validating peers") in the crypto-secure environment. For example, EOP node entity's electronic computer system may be integrated into the exemplary inventive crypto-secure environment using a module identified in FIG. 6 as an "external feed digester." In some embodiments, the exemplary inventive cryptographically-secure permissioned distributed database-centered computer system may be programmed/configured to interact with a messaging server, such as but not limited to, an Apache server for messaging queues and communicating with EOP node entities' systems for Ack/Nack and deploy/invoke/query into the exemplary inventive crypto-secure environment.

Figure 9:
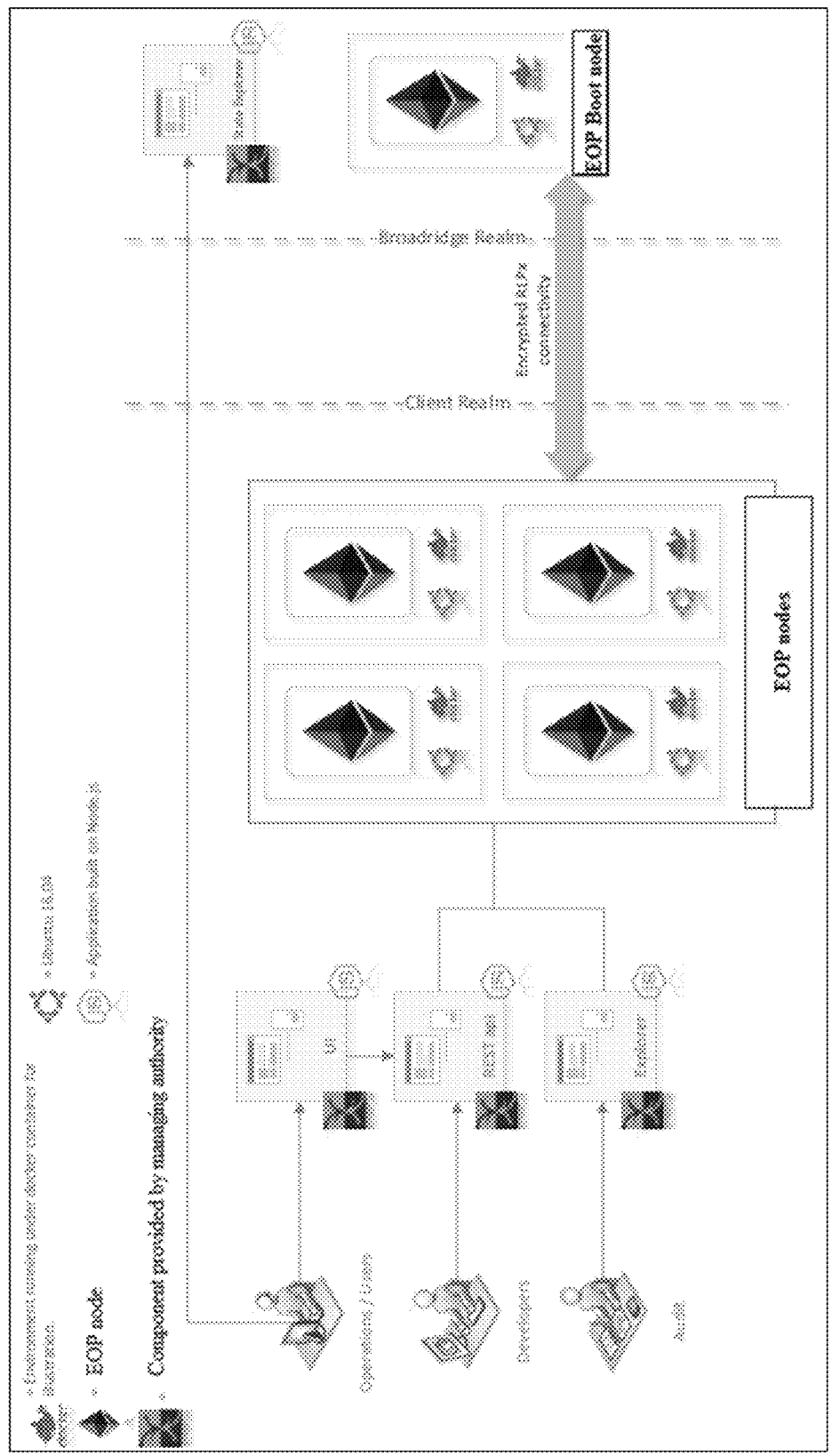

FIG. 9 shows a snapshot of an exemplary diagram of an exemplary inventive architecture of the exemplary inventive cryptographically-secure permissioned distributed database-centered computer system configured in accordance with at least some embodiments of the present invention. For example, the exemplary inventive cryptographically-secure permissioned distributed database-centered computer system may be programmed/configured to utilize a specialized user interface application ("UI") to interact with client side' EOP nodes via REST api routine(s). For example, the UI may be configured to write, into EOP nodes and/or related SESC(s), data such as, without limitation agenda, voting confirmations, etc. In some embodiments, EOP nodes may be on infrastructure of clients/users/members of the exemplary inventive cryptographically-secure permissioned distributed database-centered computer system. For example, the exemplary UI application may be programmed/configured to allow users to browse through SESCs and/or transactions.

In some embodiments, a component "State Explorer" identified in FIG. 9 illustrates a program/application/routine that may be programmed/configured to connect to EOP node(s) and allowing clients/users/members of the exemplary inventive cryptographically-secure permissioned distributed database-centered computer system to navigate through SESCs and/or transactions. For example, the "State Explorer" component may be programmed/configured to allow clients/users/members of the exemplary inventive cryptographically-secure permissioned distributed database-centered computer system to retrieve and/or analyze audit trails.

In some embodiments, a component "State Explorer" identified in FIG. 9 illustrates a program/application/routine that may be programmed/configured to run within the exemplary inventive cryptographically-secure permissioned distributed database-centered computer system and provide clients/users/members of the exemplary inventive cryptographically-secure permissioned distributed database-centered computer system ("CSPD" system) an insight on state/progress of meeting(s), voting trends, voting details, etc. For example, the "State Explorer" component may be programmed/configured to generate data views based on personal and/or group entitlement(s) defining, at least, what data may be accessed by each client/user/member of the exemplary inventive cryptographically-secure permissioned distributed database-centered computer system.

Figure 10:
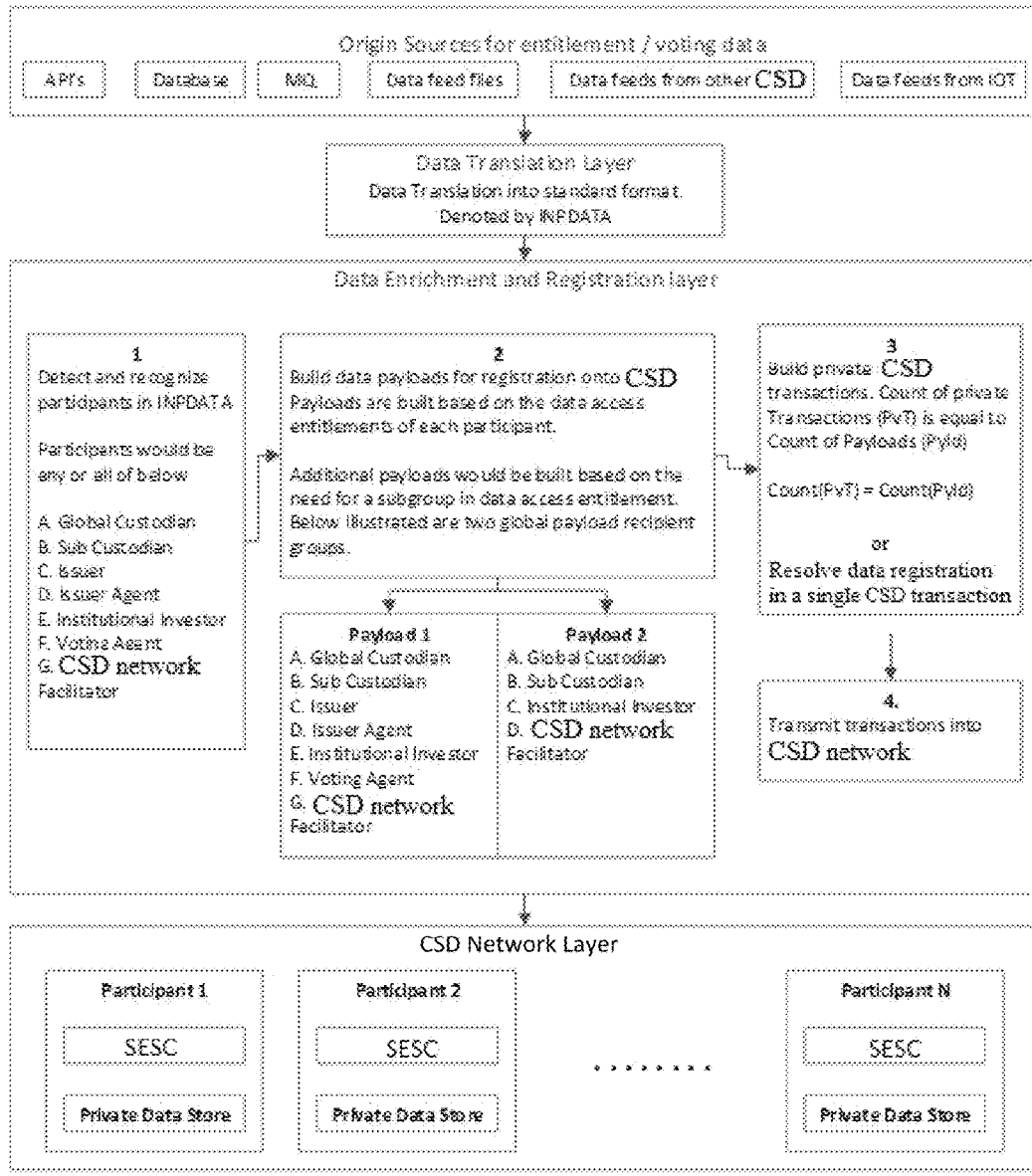

Illustrative Examples of Proxy Data Ingestion and Registration within the Exemplary Inventive Cryptographically-Secure Permissioned Distributed Database-Centered Computer System Case 1 (FIG. 10): Proxy Data Ingestion and Registration via Data Sources FIG. 10 shows a snapshot of a diagram of a workflow for an exemplary proxy data ingestion and registration via data sources. In this example, origin of entitlements and/or voting data could be data sources(s) of any electronic origin. Some of the origin sources may be APIs, data files, data feeds from other CSD networks, various messaging/querying (MQ) platforms (e.g., IBM® MQ), databases (e.g., structured, unstructured, relational, document based, etc.); Internet of Things (TOT) sources (any type, any data format, and any transmission method). In some embodiments, as shown in FIG. 10, data received from one or more origin sources may be transported into Data Translation layer, where such received data may be translated into any suitable standardized data processing format, further denoted as INPDATA. In some embodiments, as shown in FIG. 10, INPDATA is transported into Data Enrichment and Registration Layer which may be configured to recognize, determine, and record access entitlement(s) associated with each participant and/or owner identified in INPDATA. In some embodiments, as shown in FIG. 10, the exemplary inventive cryptographically-secure permissioned distributed database-centered computer system may be programmed/configured, based on one or more pre-defined data access rules to generate various payloads. In some embodiments, each payload may be a variation and/or combination of various data fields in INPDATA. In some embodiments, not all payloads may be equal and some payloads may not contain some data fields depending, for example, on one or more pre-defined data access rules that ensure only right participant and/or owner of data may view that data (e.g., data field). For example, one or more pre-defined data access rules may be based on at least one of market regulation, origin source (e.g., an application/destination from which a participant interfaces with CSD network), type of participant (e.g., issuer, custodian, guest, administrator, etc.). In some embodiments, as shown in FIG. 10, the exemplary inventive cryptographically-secure permissioned distributed database-centered computer system may be programmed/configured to transmit these payloads to the exemplary inventive CSD network via private transaction(s). In some embodiments, recipient(s) of these transactions may be determined by one or more data access rules as well. In some embodiments, private transaction(s) may be configured to reach recipient SESC(s) and be then persisted into private data stores (e.g., distributed databases of the exemplary CSD network).

Case 2 (FIG. 11): Proxy Data Ingestion and Registration via Direct Voting

In this example, origin of entitlements and/or voting data could be data sources(s) of any electronic origin. Some of the origin sources may be APIs, data files, data feeds from other CSD networks, various messaging/querying (MQ) platforms (e.g., IBM® MQ), databases (e.g., structured, unstructured, relational, document based, etc.); Internet of Things (IOT) sources (any type, any data format, and any transmission method). In some embodiments, as shown in FIG. 11, the exemplary inventive cryptographically-secure permissioned distributed database-centered computer system may be programmed/configured to allow participants/users to cast their votes via, but not limited to, a suitable application (e.g., web application, mobile application, desktop application, etc.), and/or any IOT source.

Figure 11:
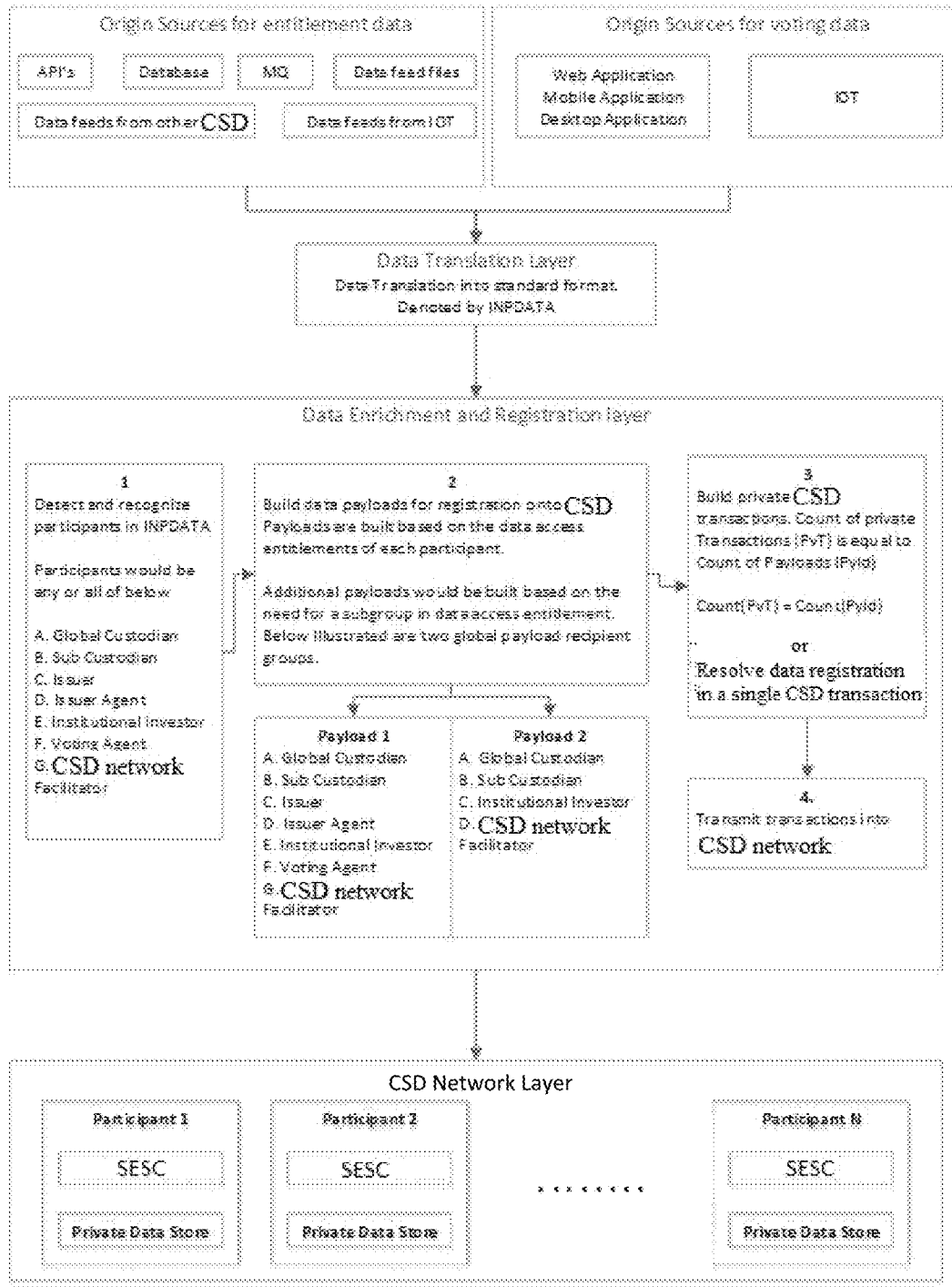

In some embodiments, as shown in FIG. 11, the entitlement/voting data received from one or more origin sources may be transported into Data Translation layer, where such received data may be translated into any suitable standardized data processing format, further denoted as INPDATA. In some embodiments, as shown in FIG. 11, INPDATA is transported into Data Enrichment and Registration Layer which may be configured to recognize, determine, and record access entitlement(s) associated with each participant and/or owner identified in INPDATA. In some embodiments, as shown in FIG. 11, the exemplary inventive cryptographically-secure permissioned distributed database-centered computer system may be programmed/configured, based on one or more pre-defined data access rules to generate various payloads. In some embodiments, each payload may be a variation and/or combination of various data fields in INPDATA. In some embodiments, not all payloads may be equal and some payloads may not contain some data fields depending, for example, on one or more pre-defined data access rules that ensure only right participant and/or owner of data may view that data (e.g., data field). For example, one or more pre-defined data access rules may be based on at least one of market regulation, origin source (e.g., an application/destination from which a participant interfaces with CSD network), type of participant (e.g., issuer, custodian, guest, administrator, etc.).

Figure 12:
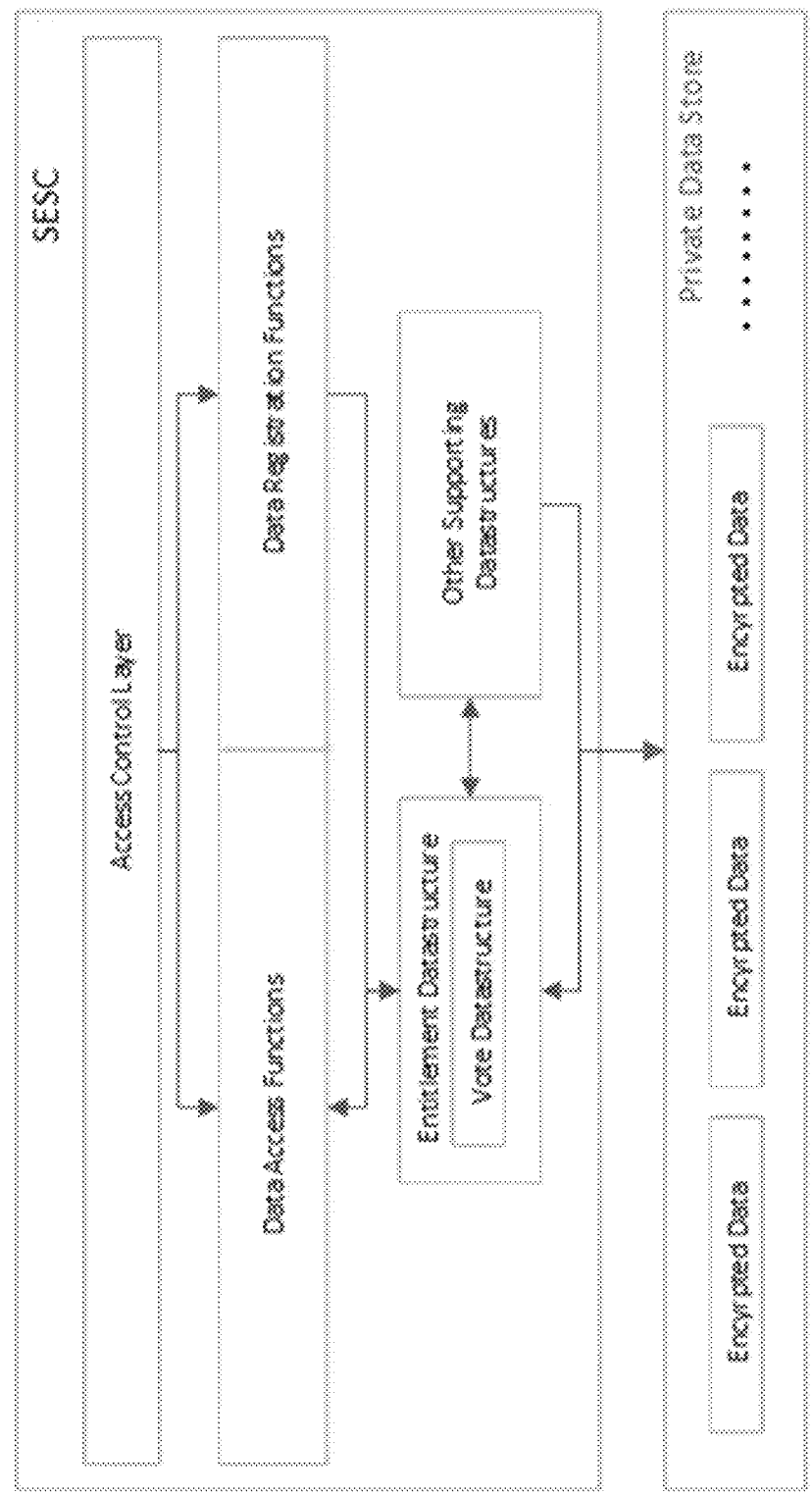

Case 3 (FIG. 12): Data Access from an Exemplary Inventive Meeting SESC

In some embodiments, exemplary meeting SESCs may reside on an exemplary CSD network and run on every node (e.g., EOP node) in the CSD network. In some embodiments, routines programmed into the exemplary proxy meeting SESCs may be classified into two categories:
1) Data Access function(s) and
2) Data Registration function(s).

In some embodiments, the data access function(s) may be configured/programmed to return proxy data for the meeting which a respective SESC serves. In some embodiments, there may be multiple data access levels. For example, each data access level may dependent on which data field(s) and/or data point(s) the participant is entitled to view/query. In response, SESC may be configured/programmed to pull relevant data from associated private data store, decrypted, translated as per the entitlement/voting data structures, and then returned to the querying application/routine.

In some embodiments, the data registration function(s) may be configured/programmed to provide ability to register proxy voting data into an exemplary CSD network. For example, the data registration function(s) may be configured/programmed to convert input data into proper data structures and sent the converted objects to private data store(s) which may be configured to then encrypt and stores such data.

Figure 13:
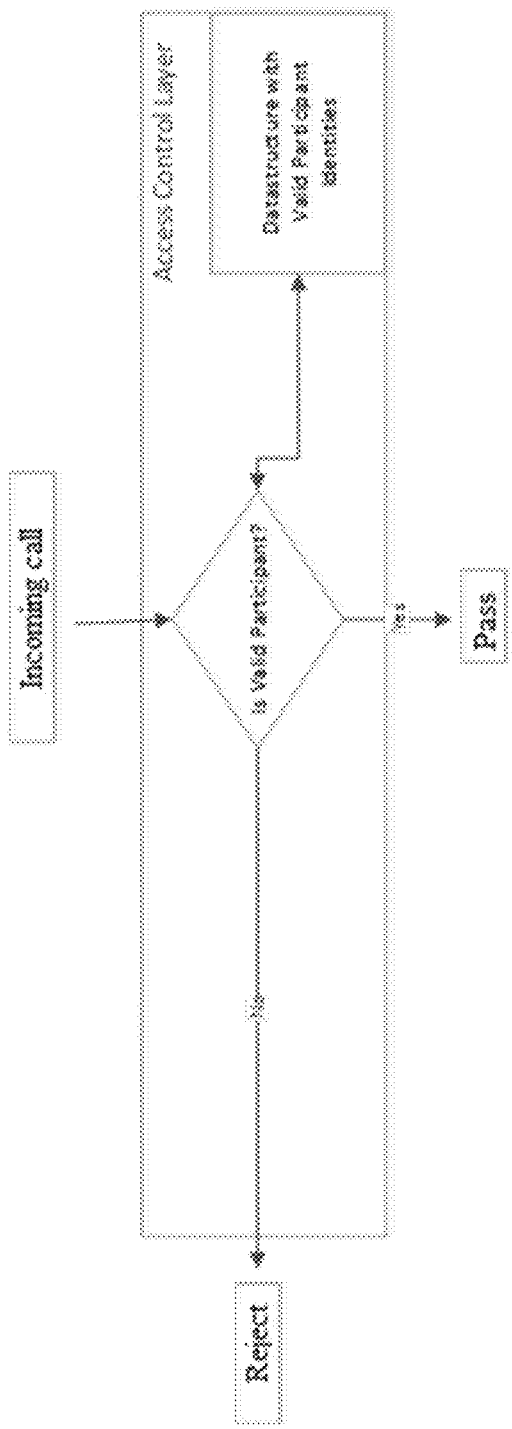

Case 4 (FIG. 13): Access Control Layer of an Exemplary Inventive Meeting SESC

In some embodiments, when an exemplary inventive meeting SESC is deployed, all authorized/approved participants should be registered into at least one data structure of the exemplary inventive meeting SESC itself. For example, in some embodiments, every time an access or registration call is made to the exemplary inventive meeting SESC, such call passes through this Access Control layer which may be programmed/configured to check if the caller is an authorized/approved participant for this meeting.

Illustrative Examples of Utilizing SESCs for Managing N-Lateral (e.g., Bi-Lateral) Re-Purchase Agreements In some embodiments, the exemplary inventive cryptographically-secure permissioned distributed database-centered computer system may be programmed/configured to manage SESCs that may be programmed to track and execute both legs of a non-cleared re-purchase transaction (repo transaction). For example, a particular EOP node participant (who may be, but not limited to, a party to an exemplary repo transaction and/or a custodian of security(ies) being pledged as collateral) may set-up a corresponding SESC to crypto-securely capture at least the following data: terms, trade, asset substitution(s) and/or a return of collateral.

Figure 14:
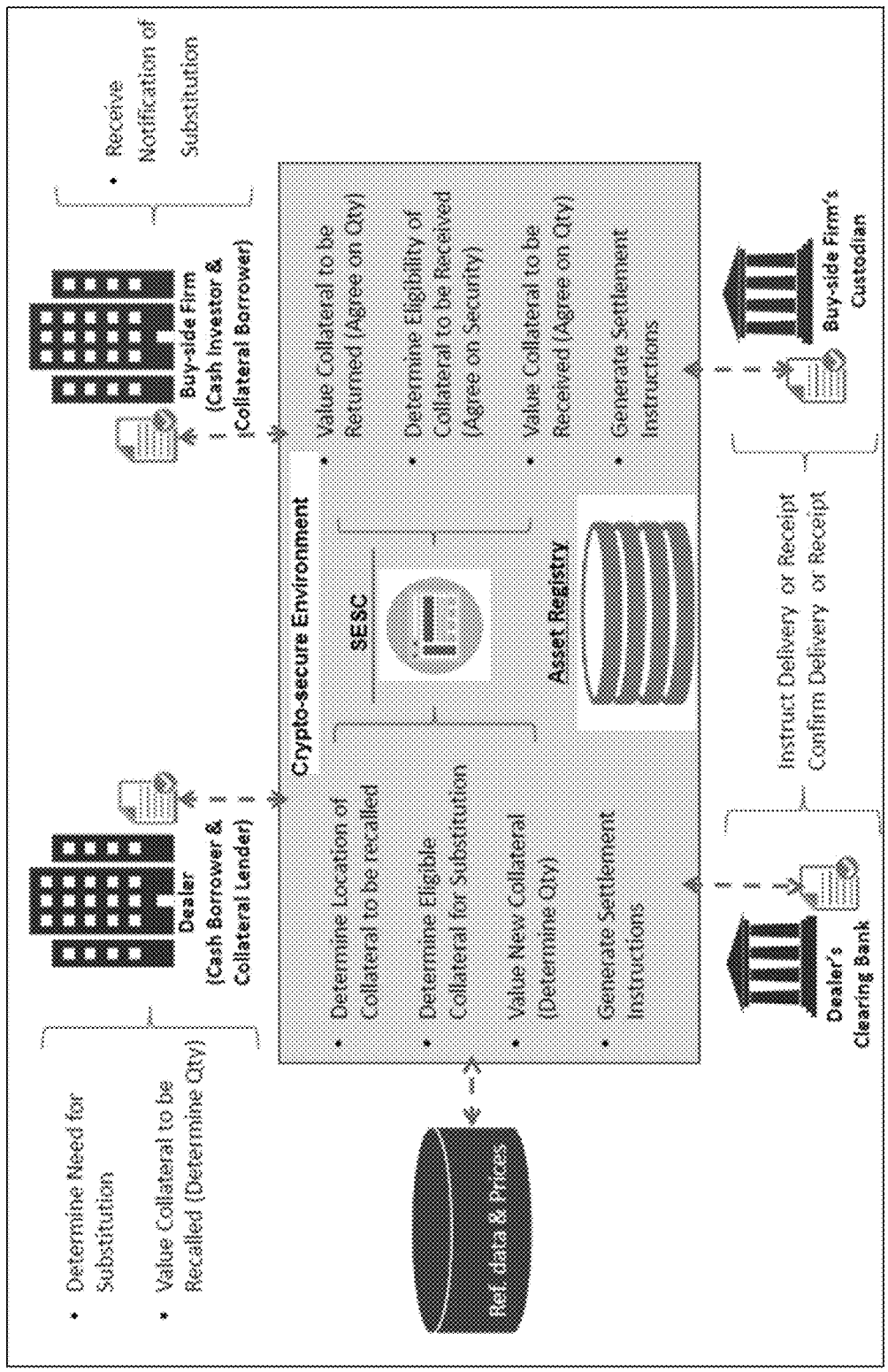

FIG. 14 shows a snapshot of an exemplary diagram of an inventive workflow which the exemplary inventive cryptographically-secure permissioned distributed database-centered computer system may be programmed/configured to support an exemplary SESC which can be programmed to track and execute both legs of a non-cleared repo transaction.

Figure 15:
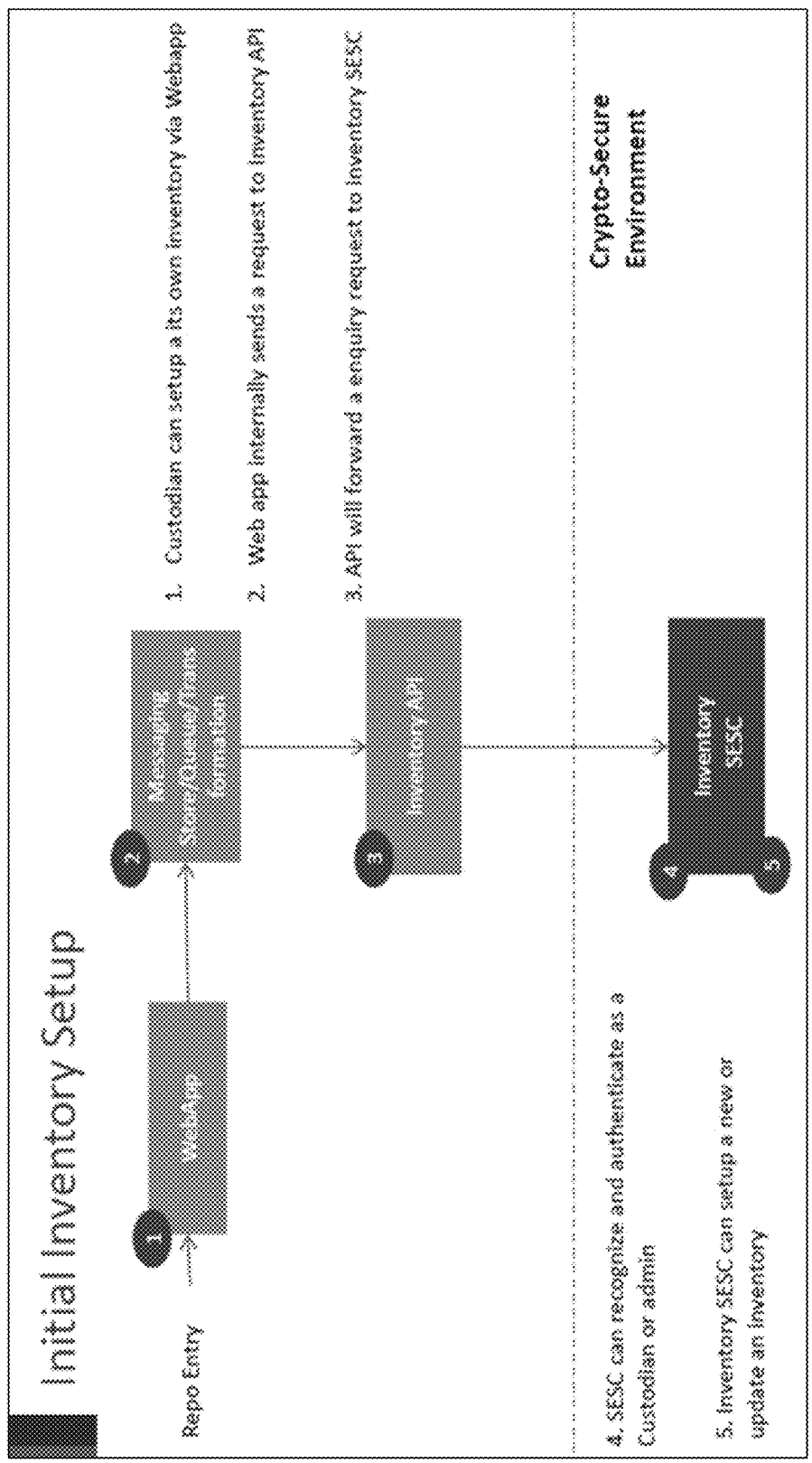

FIG. 15 shows a snapshot of an exemplary diagram of an inventive workflow that a custodian, who controls an exemplary EOP node, can utilize an exemplary Inventory SESC to set-up a new inventory of assets or update an existing inventory.

Figure 16:
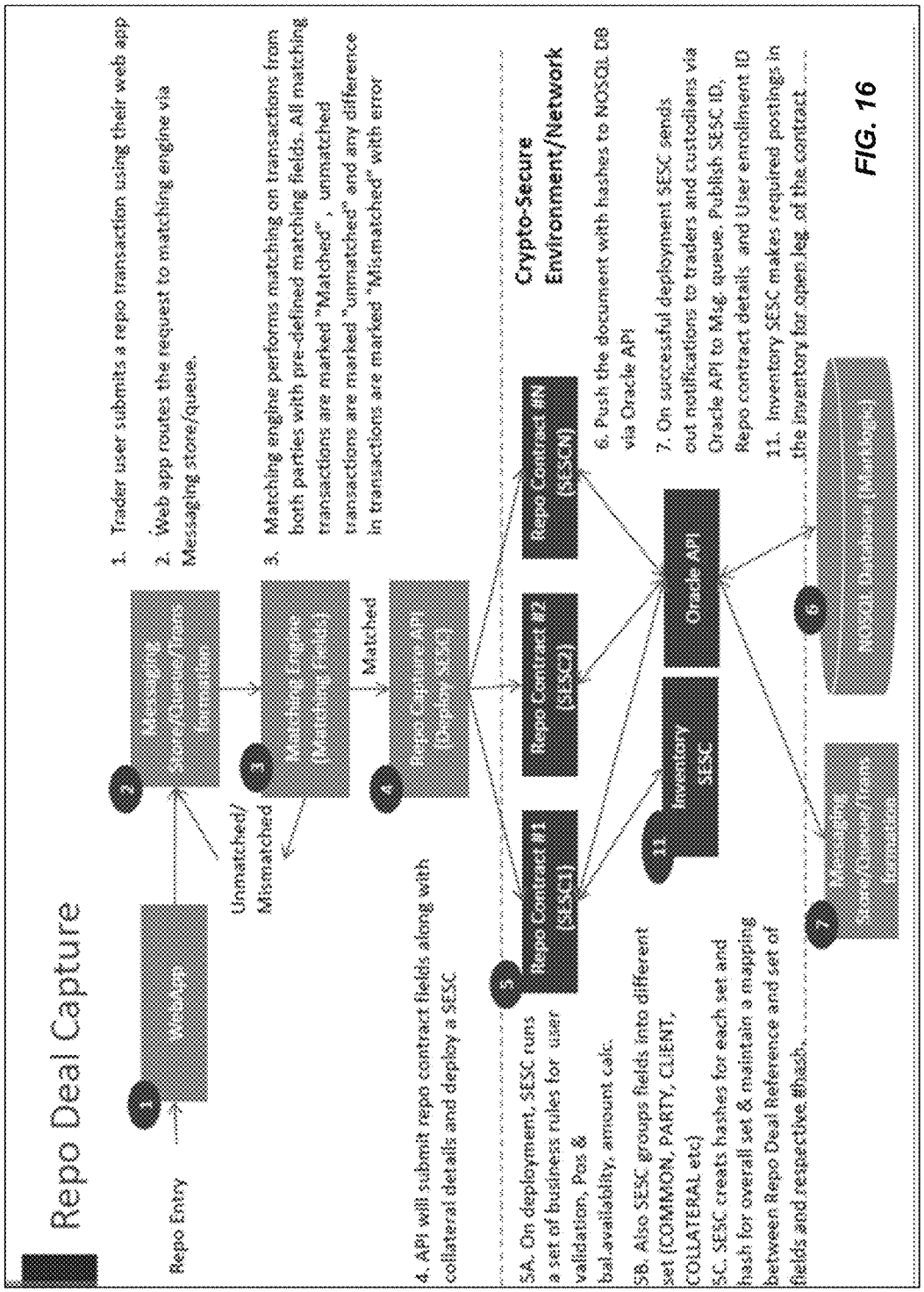

FIG. 16 shows a snapshot of an exemplary diagram of an inventive workflow in accordance with which the exemplary inventive cryptographically-secure permissioned distributed database-centered computer system may be programmed/configured to create a particular SESC for each repo contract. For example, the exemplary inventive cryptographically-secure permissioned distributed database-centered computer system may be programmed/configured, for each repo contract, to accept repo details along with collaterals from users, and, then, generate hashes to be stored in the particular SESC and actual data in a separate distributed database (e.g., NOSQL database). For example, the particular SESC may be programmed/configured to handle approval and notification process along with checking eligibility rules and inventory balances, amend the data store (e.g., NOSQL database), and regenerate respective hashes.

Figure 17:
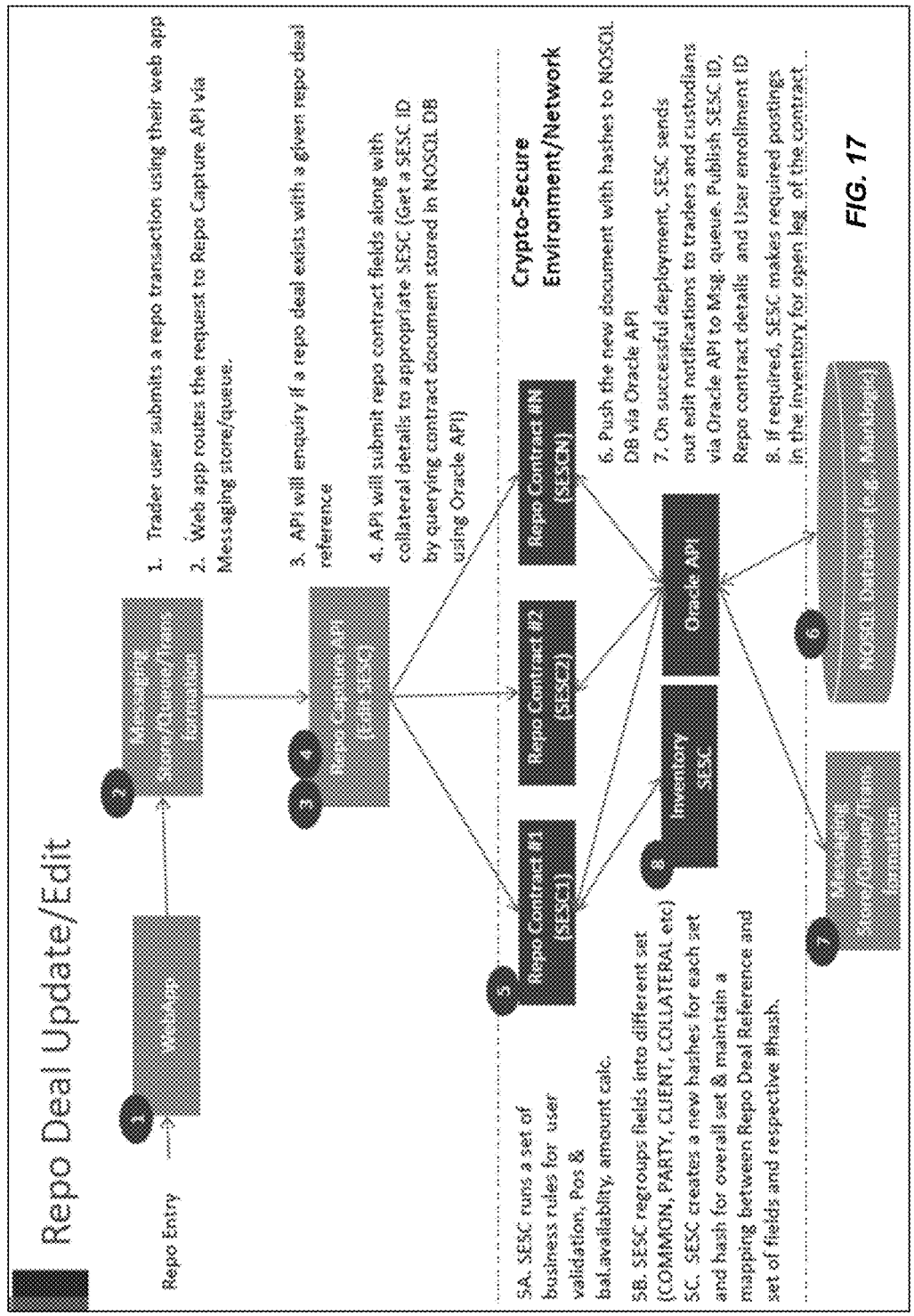

FIG. 17 shows a snapshot of an exemplary diagram of an inventive workflow in accordance with which the exemplary inventive cryptographically-secure permissioned distributed database-centered computer system may be programmed/configured to allow a particular SESC, which manages a particular repo contract, to self-update with any changes to such repo contract and execute any programmed actions based on such update.

Figure 18:
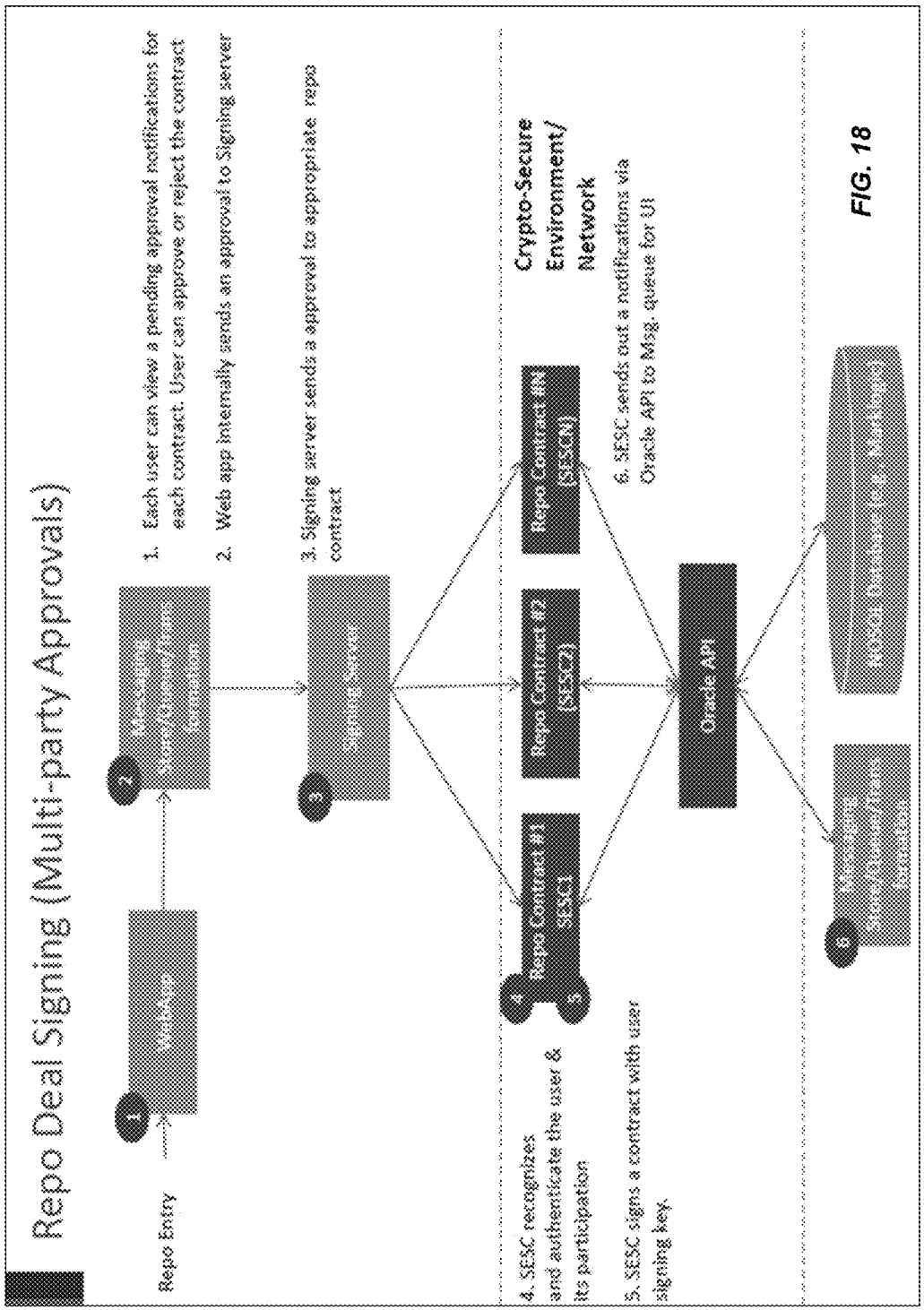

FIG. 18 shows a snapshot of an exemplary diagram of an inventive workflow in accordance with which the exemplary inventive cryptographically-secure permissioned distributed database-centered computer system may be programmed/configured to allow a particular SESC, which manages a particular repo contract, to sign such repo contract on behalf of a party (e.g., an EOP node member), by utilizing a user signing key.

Figure 19:
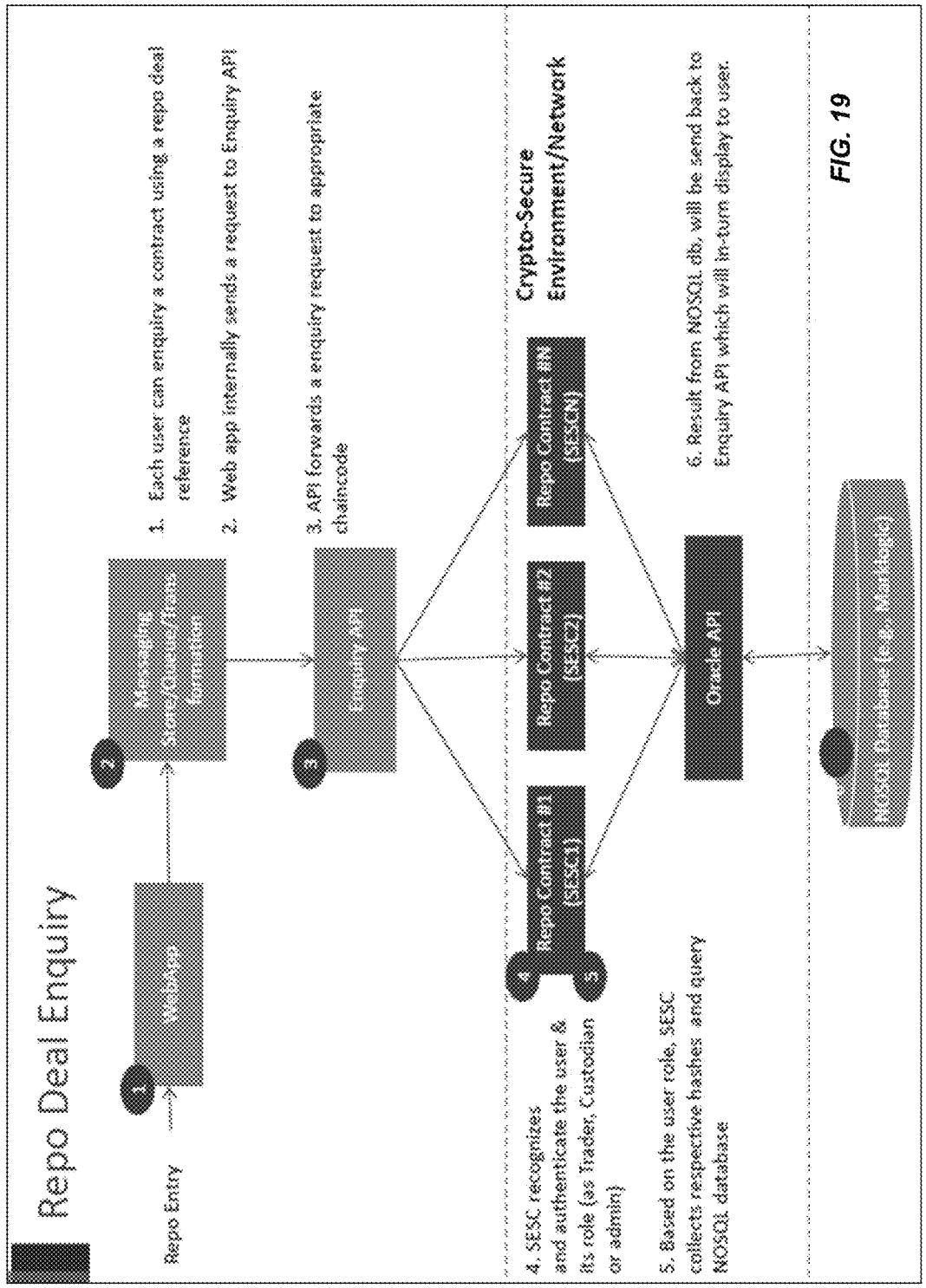

FIG. 19 shows a snapshot of an exemplary diagram of an inventive workflow in accordance with which the exemplary inventive cryptographically-secure permissioned distributed database-centered computer system may be programmed/configured to allow a particular SESC, which manages a particular repo contract, to respond to an electronic inquiry about such repo contract.

Figure 20:
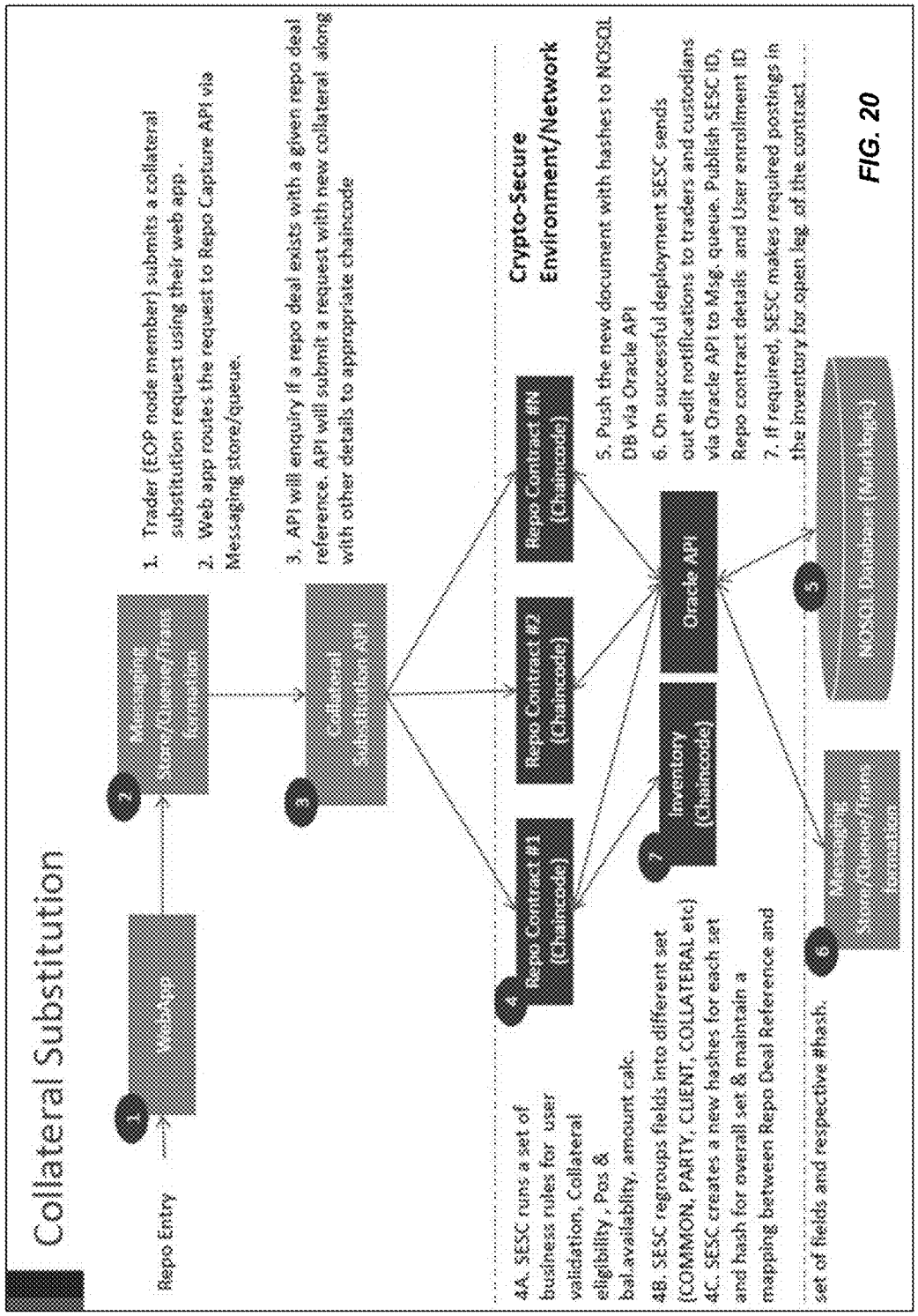

FIG. 20 shows a snapshot of an exemplary diagram of an inventive workflow in accordance with which the exemplary inventive cryptographically-secure permissioned distributed database-centered computer system may be programmed/configured to allow a particular SESC, which manages a particular repo contract, to substitute collateral of such repo contract.

Illustrative Examples of Utilizing SESCs for Managing Purchases of Account Receivables (A/R)

Typically, in the U.S., an A/R buyer may establish their ownership ("perfects interest") of a receivable by filing a UCC-1 statement in the state in which a seller is registered. Typically, the buyer may conduct a UCC search to confirm that the seller has not sold the receivables to another buyer. For example, in the event of a bankruptcy filing by the supplier/seller, the buyer must prove perfection of interest in bankruptcy court in order to establish a "true sale" of the receivable.

In some embodiments, the exemplary inventive cryptographically-secure permissioned distributed database-centered computer system may be programmed/configured to manage SESCs that may be programmed to track invoice-specific data (e.g., invoice number, debtor, invoice date, amount, etc.) to disallow multiple records with the same invoice details. In some embodiments, the exemplary inventive cryptographically-secure permissioned distributed database-centered computer system may be programmed/configured to allow an EOP note member to set-up a particular SESC to be responsible for a corresponding A/R purchase transaction. For example, each EOP node may store a complete updated instance of an exemplary distributed asset registry database which would contain records of all "perfected" interests. In some embodiments, SESCs may be programmed/configured to reject incomplete records. In some embodiments, SESCs may be programmed/configured to update the corresponding record(s) in the exemplary distributed asset registry database of asset registry when a receivable is sold. For example, each time a supplier delivers goods and an invoice is produced, a corresponding SESC may be invoked to update corresponding record(s) in the exemplary distributed asset registry database and to synchronize the instances of the exemplary distributed asset registry database among the EOP member nodes.

Additional Illustrative Examples of Computer System Architectures and Associate Device which may be Programmed to Operate in Accordance with at least some Embodiments of the Present Invention In some embodiments, the exemplary inventive cryptographically-secure permissioned distributed database-centered computer system may be programmed/configured to operate based on node location data received regarding physical location(s) of one or more EOP nodes. For example, the node location data may be based on data obtained through, for example, a global positioning system (GPS) and/or any similarly suitable methodologies.

Figure 21:
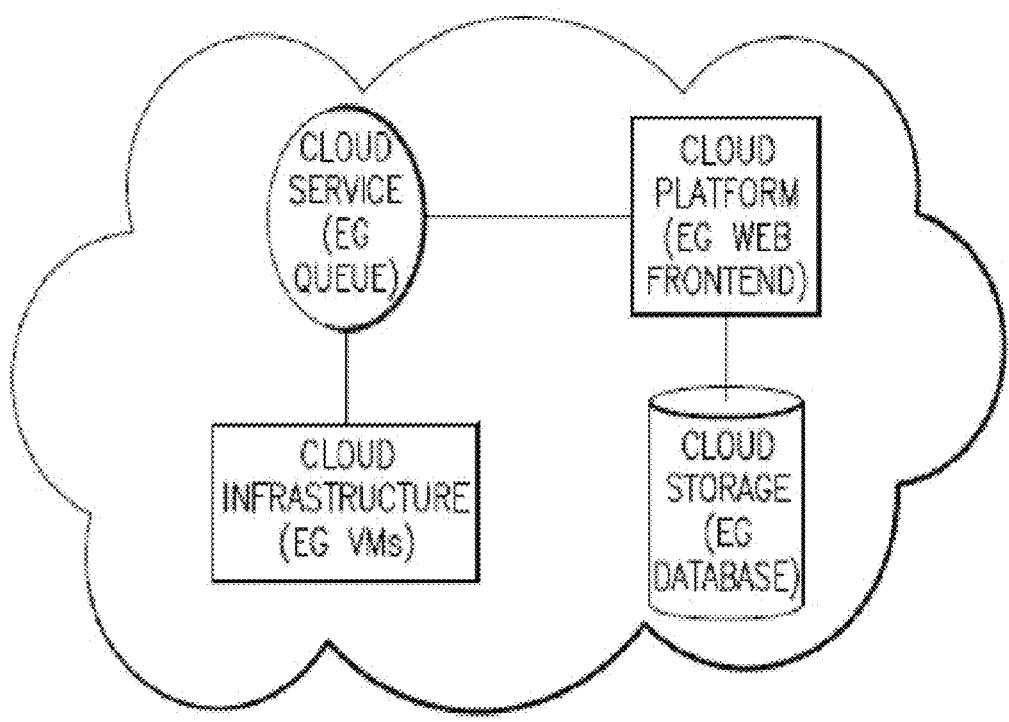
Figure 22:
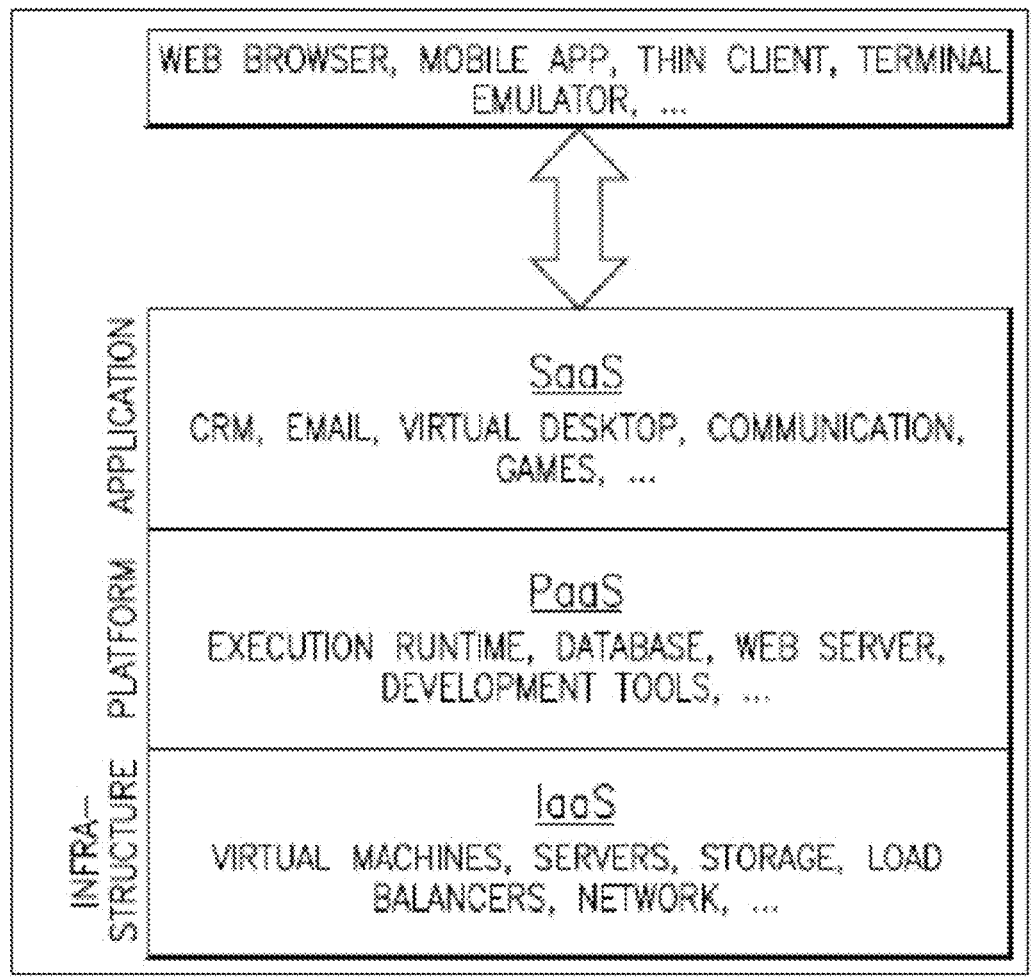

For purposes of the instant description, the terms "cloud," "Internet cloud," "cloud computing," "cloud architecture," and similar terms correspond to at least one of the following utilized by the exemplary inventive computer-programmed systems and the exemplary inventive computer-processing methods of the present invention: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the inventive computer flexible lease basis system offers/manages the cloud computing/architecture as, but not limiting to: infrastructure a service (IaaS), platform as a service (PaaS), and software as a service (SaaS). FIGS. 21 and 22 illustrate schematics of exemplary implementations of the cloud computing/architecture which the exemplary inventive adaptive self-trained computer engine the present invention is configured/programmed to utilize and/or interface with.

In some embodiments, the present invention provides for an exemplary computer system which includes at least the following components: a network of externally owned presence (EOP) member nodes; i) where each EOP member node is owned by a distinct entity; ii) where the network of externally owned presence (EOP) nodes includes: 1) at least one supervisory EOP member node and 2) a plurality of peer EOP member nodes; iii) where the at least one supervisory EOP member node is configured to generate at least one personalized cryptographic private key for each peer EOP member node; iv) where each personalized cryptographic private key is only known to a corresponding peer EOP member node which controls a secrecy of such personalized cryptographic private key; at least one distributed database, storing a plurality of persistent data objects; and a plurality of self-contained self-executing software containers (SESCs); i) where each SESC includes an independently executable software code which is at least configured to: 1) generate at least one state hash representative at least one current state of at least one persistent data object, 2) perform at least one data action with the at least one persistent data object; and 3) determine that a particular EOP member node has a permission to cause the SESC to perform the at least one data action with the at least one persistent data object based, at least in part on a particular personalized cryptographic private key of the particular EOP member node and at least one attribute associated of the particular EOP member node; and 4) determine that the at least one data action with the at least one persistent data object has been based, at least in part, on at least one explicit policy criteria check to which all EOP member nodes have agreed to follow.

In some embodiments, the plurality of SESCs includes: a plurality of meeting SESCs, where each meeting SESC is at least configured to: obtain current data related to a particular corporate event of a publicly traded company from at least one electronic source associate with at least one EOP member node; perform the at least one explicit policy criteria check associated with at least one of the at least one electronic source, the at least one EOP member node, and the current data; generate at least one meeting state hash representative the current data of the particular corporate event; store the at least one meeting state hash and the current data of the particular corporate event in at least one meeting persistent data object in the at least one distributed database; keep the at least one meeting state hash within the meeting SESC; and generate an output representative of a current state of the particular corporate event.

In some embodiments, each SESC is further configured to generate the at least one SESC state hash based on at least one of the following cryptographic hash functions: SHA-256, Dagger-Hashimoto Hashes, and SHA3.

In some embodiments, the present invention provides for an exemplary computer-implemented method that includes at least the following steps administering a network of externally owned presence (EOP) member nodes; i) where each EOP member node is owned by a distinct entity; ii) where the network of externally owned presence (EOP) nodes includes: 1) at least one supervisory EOP member node and 2) a plurality of peer EOP member nodes; iii) where the at least one supervisory EOP member node is configured to generate at least one personalized cryptographic private key for each peer EOP member node; iv) where each personalized cryptographic private key is only known to a corresponding peer EOP member node which controls a secrecy of such personalized cryptographic private key; administering at least one distributed database, storing a plurality of persistent data objects; and programming a plurality of self-contained self-executing software containers (SESCs); i) where each SESC includes an independently executable software code which is at least configured to: 1) generate at least one state hash representative at least one current state of at least one persistent data object, 2) perform at least one data action with the at least one persistent data object; and 3) determine that a particular EOP member node has a permission to cause the SESC to perform the at least one data action with the at least one persistent data object based, at least in part on a particular personalized cryptographic private key of the particular EOP member node and at least one attribute associated of the particular EOP member node; and 4) determine that the at least one data action with the at least one persistent data object has been based, at least in part, on at least one explicit policy criteria check to which all EOP member nodes have agreed to follow.

In some embodiments, the plurality of SESCs includes: a plurality of meeting SESCs, where each meeting SESC is at least configured to: obtain current data related to a particular corporate event of a publicly traded company from at least one electronic source associate with at least one EOP member node; perform the at least one explicit policy criteria check associated with at least one of the at least one electronic source, the at least one EOP member node, and the current data; generate at least one meeting state hash representative the current data of the particular corporate event; store the at least one meeting state hash and the current data of the particular corporate event in at least one meeting persistent data object in the at least one distributed database; keep the at least one meeting state hash within the meeting SESC; and generate an output representative of a current state of the particular corporate event. In some embodiments, the particular corporate event is an annual meeting. In some embodiments, the current data related to the annual meeting includes agenda data, ballot data, entitlement data, and voting data. In some embodiments, the at least one explicit policy criteria check is at least one of: i) verifying that a particular investor can access only a vote entitlement related to the particular investor; ii) verifying that a particular custodian can access only the vote entitlement when the particular investor is a client of the particular custodian; and iii) verifying that a particular issuer can access only vote details without accessing related investor data.

In some embodiments, the plurality of SESCs includes: a plurality of repurchasing contract SESCs, where each repurchasing contract SESC is at least configured to: obtain current repurchasing contract data for a particular repurchasing contract from at least one electronic source associate with at least one EOP member node; perform the at least one explicit policy criteria check associated with at least one of the at least one electronic source, the at least one EOP member node, and the current repurchasing contract data;

obtain electronic signatures from all parties to the particular repurchasing contract; generate at least one repurchasing contract state hash representative the current repurchasing contract data; store the at least one repurchasing contract state hash and the current repurchasing contract data of the particular repurchasing contract in at least one repurchasing contract persistent data object in the at least one distributed database; keep the at least one repurchasing contract state hash within the repurchasing contract SESC; substitute at least one first collateral being used in the particular repurchasing contract for another collateral; and generate an output representative of a current state of the particular repurchasing contract.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A computer system, comprising:
   a network of externally owned presence (EOP) member nodes;
   i) wherein each EOP member node is owned by a distinct entity;
   ii) wherein the network of externally owned presence (EOP) nodes comprises:
      1) at least one supervisory EOP member node and
      2) a plurality of peer EOP member nodes;
   iii) wherein the at least one supervisory EOP member node is configured to generate at least one personalized cryptographic private key for each peer EOP member node;
   iv) wherein each personalized cryptographic private key is only known to a corresponding peer EOP member node which controls a secrecy of such personalized cryptographic private key;
   at least one distributed database, storing a plurality of persistent data objects; and
   a plurality of self-contained self-executing software containers (SESCs);
   i) wherein each SESC comprises an independently executable software code which is at least configured to:
      1) apply an entropy to generate at least one state hash representing at least one current state of at least one persistent data object;
      2) perform at least one data action with the at least one persistent data object;
      3) determine that a particular EOP member node has a permission to cause the SESC to perform the at least one data action with the at least one persistent data object based, at least in part on a particular personalized cryptographic private key of the particular EOP member node and at least one attribute associated with the particular EOP member node; and
      4) determine that the at least one data action with the at least one persistent data object has been based, at least in part, on at least one explicit policy criteria check to which all EOP member nodes have agreed to follow; and
   wherein the at least one distributed database is further configured to store the at least one state hash representing the at least one current state of the at least one persistent data object.

2. The computer system of claim 1, wherein the plurality of SESCs comprises:
   a plurality of meeting SESCs, wherein each meeting SESC is at least configured to:
      obtain current data related to a particular corporate event of a publicly traded company from at least one electronic source associate with at least one EOP member node;
      perform the at least one explicit policy criteria check associated with at least one of the at least one electronic source, the at least one EOP member node, and the current data;
      applying the entropy to generate at least one meeting state hash representing the current data of the particular corporate event;
      store the at least one meeting state hash and the current data of the particular corporate event in at least one meeting persistent data object in the at least one distributed database;
      keep the at least one meeting state hash within the meeting SESC; and
      generate an output representing a current state of the particular corporate event.

3. The computer system of claim 2, wherein the particular corporate event is an annual meeting.

4. The computer system of claim 3, wherein the current data related to the annual meeting comprises agenda data, ballot data, entitlement data, and voting data.

5. The computer system of claim 3, wherein the at least one explicit policy criteria check is at least one of:
   i) verifying that a particular investor can access only a vote entitlement related to the particular investor;
   ii) verifying that a particular custodian can access only the vote entitlement when the particular investor is a client of the particular custodian; and
   iii) verifying that a particular issuer can access only vote details without accessing related investor data.

6. The computer system of claim 2, wherein each meeting SESC is further configured to generate the at least one meeting state hash based on at least one of the following cryptographic hash functions: SHA-256, Dagger-Hashimoto Hashes, and SHA3.

7. The computer system of claim 1, wherein each SESC is further configured to generate the at least one state hash based on at least one of the following cryptographic hash functions: SHA-256, Dagger-Hashimoto Hashes, and SHA3.

8. The computer system of claim 1, wherein the plurality of SESCs comprises:
   a plurality of repurchase contract SESCs, wherein each re-purchase contract SESC is at least configured to:
      obtain current re-purchase contract data for a particular re-purchase contract from at least one electronic source associate with at least one EOP member node;
      perform the at least one explicit policy criteria check associated with at least one of the at least one electronic source, the at least one EOP member node, and the current re-purchase contract data;
      obtain electronic signatures from all parties to the particular re-purchase contract;
      apply entropy to generate at least one re-purchase contract state hash representing the current re-purchase contract data;
      store the at least one re-purchase contract state hash and the current re-purchase contract data of the particular re-purchase contract in at least one re-purchase contract persistent data object in the at least one distributed database;
keep the at least one re-purchase contract state hash within the re-purchase contract SESC;
substitute at least one first collateral being used in the particular re-purchase contract for another collateral; and
generate an output representing an updated current state of the particular re-purchase contract.

9. A computer-implemented method, comprising:
providing a network of externally owned presence (EOP) member nodes;
  i) wherein each EOP member node is owned by a distinct entity;
  ii) wherein the network of externally owned presence (EOP) nodes comprises:
    1) at least one supervisory EOP member node and
    2) a plurality of peer EOP member nodes;
  iii) wherein the at least one supervisory EOP member node is configured to generate at least one personalized cryptographic private key for each peer EOP member node;
  iv) wherein each personalized cryptographic private key is only known to a corresponding peer EOP member node which controls a secrecy of such personalized cryptographic private key;
providing at least one distributed database, storing a plurality of persistent data objects; and
providing a plurality of self-contained self-executing software containers (SESCs);
  i) wherein each SESC comprises an independently executable software code which is at least configured to:
    1) apply an entropy to generate at least one state hash representing at least one current state of at least one persistent data object,
    2) perform at least one data action with the at least one persistent data object; and
    3) determine that a particular EOP member node has a permission to cause the SESC to perform the at least one data action with the at least one persistent data object based, at least in part on a particular personalized cryptographic private key of the particular EOP member node and at least one attribute associated with the particular EOP member node; and
    4) determine that the at least one data action with the at least one persistent data object has been based, at least in part, on at least one explicit policy criteria check to which all EOP member nodes have agreed to follow; and
wherein the at least one distributed database is further configured to store the at least one state hash representing the at least one current state of the at least one persistent data object.

10. The computer-implemented method of claim 9, wherein the plurality of SESCs comprises:
a plurality of meeting SESCs, wherein each meeting SESC is at least configured to:
obtain current data related to a particular corporate event of a publicly traded company from at least one electronic source associate with at least one EOP member node;
perform the at least one explicit policy criteria check associated with at least one of the at least one electronic source, the at least one EOP member node, and the current data;
apply the entropy to generate at least one meeting state hash representing the current data of the particular corporate event;
store the at least one meeting state hash and the current data of the particular corporate event in at least one meeting persistent data object in the at least one distributed database;
keep the at least one meeting state hash within the meeting SESC; and
generate an output representing a current state of the particular corporate event.

11. The computer-implemented method of claim 10, wherein the particular corporate event is an annual meeting.

12. The computer-implemented method of claim 11, wherein the current data related to the annual meeting comprises agenda data, ballot data, entitlement data, and voting data.

13. The computer-implemented method of claim 11, wherein the at least one explicit policy criteria check is at least one of:
  i) verifying that a particular investor can access only a vote entitlement related to the particular investor;
  ii) verifying that a particular custodian can access only the vote entitlement when the particular investor is a client of the particular custodian; and
  iii) verifying that a particular issuer can access only vote details without accessing related investor data.

14. The computer-implemented method of claim 10, wherein each meeting SESC is further configured to generate the at least one meeting state hash based on at least one of the following cryptographic hash functions: SHA-256, Dagger-Hashimoto Hashes, and SHA3.

15. The computer-implemented method of claim 9, wherein each SESC is further configured to generate the at least one state hash based on at least one of the following cryptographic hash functions: SHA-256, Dagger-Hashimoto Hashes, and SHA3.

16. The computer-implemented method of claim 9, wherein the plurality of SESCs comprises:
a plurality of re-purchase contract SESCs, wherein each re-purchase contract SESC is at least configured to:
obtain current re-purchase contract data for a particular re-purchase contract from at least one electronic source associate with at least one EOP member node;
perform the at least one explicit policy criteria check associated with at least one of the at least one electronic source, the at least one EOP member node, and the current re-purchase contract data;
obtain electronic signatures from all parties to the particular re-purchase contract;
apply entropy to generate at least one re-purchase contract state hash representing the current re-purchase contract data;
store the at least one re-purchase contract state hash and the current re-purchase contract data of the particular re-purchase contract in at least one re-purchase contract persistent data object in the at least one distributed database;
keep the at least one re-purchase contract state hash within the re-purchase contract SESC;
substitute at least one first collateral being used in the particular re-purchase contract for another collateral; and
generate an output representing an updated current state of the particular re-purchase contract.

* * * * *